United States Patent
Kim et al.

(10) Patent No.: US 9,888,439 B2
(45) Date of Patent: Feb. 6, 2018

(54) METHOD FOR COMMUNICATION BASED ON IDENTIFYING INFORMATION ASSIGNMENT AND APPARATUS FOR THE SAME

(71) Applicant: LG Electronics Inc., Seoul (KR)

(72) Inventors: Eun Sun Kim, Anyang-si (KR); Yong Ho Seok, Anyang-si (KR); Jong Hyun Park, Anyang-si (KR); Hyang Sun You, Anyang-si (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 14/943,497

(22) Filed: Nov. 17, 2015

(65) Prior Publication Data

US 2016/0165534 A1    Jun. 9, 2016

Related U.S. Application Data

(63) Continuation of application No. 13/980,012, filed as application No. PCT/KR2012/000353 on Jan. 16, 2012, now Pat. No. 9,220,061.
(Continued)

(51) Int. Cl.
*G08C 17/00* (2006.01)
*H04W 52/02* (2009.01)
(Continued)

(52) U.S. Cl.
CPC ... *H04W 52/0206* (2013.01); *H04W 52/0216* (2013.01); *H04W 52/0229* (2013.01);
(Continued)

(58) Field of Classification Search
None
See application file for complete search history.

(56) References Cited

U.S. PATENT DOCUMENTS

2004/0253996 A1* 12/2004 Chen ............... H04W 52/0216
455/574
2005/0009578 A1    1/2005 Liu
(Continued)

FOREIGN PATENT DOCUMENTS

CN         1809008 A      7/2006
KR    1020070033287 A     3/2007
(Continued)

OTHER PUBLICATIONS

XP031157048: "Scheduled PSm for Minimizing Energy in Wireless LANs" Yong He et al, pp. 154-163, Oct. 1, 2007.
(Continued)

*Primary Examiner* — Minh-Trang Nguyen
(74) *Attorney, Agent, or Firm* — Dentons US LLP

(57) ABSTRACT

A communication method based on identifying information assignment in a wireless local area network (WLAN) system, performed by a station (STA), is provided. The method includes receiving an identifier assignment message from an access point (AP), wherein the identifier assignment message comprises identifying information for the STA, and TIM offset information for a time point at which at least one traffic indication map (TIM) element for the STA starts to be transmitted; receiving a first TIM element from the AP at a time point indicated by the TIM offset information; determining whether the first TIM element comprises the identifying information; and receiving a first data frame from the AP if the first TIM element contains the identifying information.

15 Claims, 18 Drawing Sheets

Related U.S. Application Data

(60) Provisional application No. 61/433,250, filed on Jan. 16, 2011, provisional application No. 61/447,706, filed on Mar. 1, 2011, provisional application No. 61/448,207, filed on Mar. 2, 2011, provisional application No. 61/556,186, filed on Nov. 5, 2011.

(51) Int. Cl.
*H04W 74/00* (2009.01)
*H04W 84/12* (2009.01)

(52) U.S. Cl.
CPC .......... *H04W 74/006* (2013.01); *H04W 84/12* (2013.01); *Y02B 60/50* (2013.01)

(56) References Cited

U.S. PATENT DOCUMENTS

| | | | |
|---|---|---|---|
| 2007/0086369 A1 | 4/2007 | Tang | 370/318 |
| 2009/0010191 A1* | 1/2009 | Wentink | H04W 52/0216 |
| | | | 370/311 |
| 2010/0189021 A1* | 7/2010 | He | H04W 52/00 |
| | | | 370/311 |
| 2010/0284316 A1 | 11/2010 | Sampathkumar | 370/311 |

FOREIGN PATENT DOCUMENTS

| | | |
|---|---|---|
| KR | 1020080044018 A | 5/2008 |
| KR | 1020100051718 A | 5/2010 |

OTHER PUBLICATIONS

XP55174260: IEEE Standard for Information Technology—Telecommunications and information exhange between systems; Local and metropolitan area networks—Specific requirements, Part 11: Wireless LAN medium Access Control (MAC) and Physical Layer (PHY) Specifications, Sep. 2010. pp. 1-2008.

XP017675521: IEEE 802.11-11/0088r1, Jan. 2011, "Association ID Management for TGah".

Yong He, "Scheduled PSM for Minimizing Energy in Wireless LANs", 2007 IEEE, pp. 154-163.

\* cited by examiner

FIG. 8

| Category | Action | Length | AID Assignment Type | AID | TCLAS |
|---|---|---|---|---|---|
| 810 | 820 | 830 | 840 | 850 | 860 |

800

METHOD FOR COMMUNICATION BASED ON IDENTIFYING INFORMATION ASSIGNMENT AND APPARATUS FOR THE SAME

This application is a Continuation of U.S. application Ser. No. 13/980,012 filed Aug. 13, 2013, which is a National Stage under 35 U.S.C. 371 of International Application No. PCT/KR2012/000353 filed Jan. 16, 2012, which claims the benefit of U.S. Provisional Application Nos. 61/433,250 filed Jan. 16, 2011; 61/447,706 filed Mar. 1, 2011; 61/448,207 filed Mar. 2, 2011 and 61/556,186 filed Nov. 5, 2011, all of which are hereby incorporated by reference in their entirety.

TECHNICAL FIELD

The present invention relates to a wireless local area network (WLAN) system, and more particularly, to a communication method of a station (STA) based on identifying information assignment in the WLAN system and an apparatus supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

The WLAN system supports an active mode and a power save mode as an operation mode of a station (STA). The active mode implies an operation mode in which the STA operates in an awake state capable of transmitting and receiving a frame. On the other hand, the power save mode is supported for power saving of an STA which does not require the active state to receive the frame. An STA supporting the power save mode (PSM) can avoid unnecessary power consumption by operating in a doze mode when it is not a time duration in which the STA can access to its radio medium. That is, the STA operates in the awake state only for a time duration in which a frame can be transmitted to the STA or a time duration in which the STA can transmit the frame.

In the WLAN system, an access point (AP) manages traffic to be transmitted to STAs that operate in the power save mode. A method is required in which, if buffered traffic to be transmitted to a specific STA exists, the AP reports the existence of the buffered traffic to the STA and transmits a frame. Further, a method is required in which the STA determines whether there is buffered traffic for the STA when the STA operates in the doze state, and if there is buffered traffic for the STA, the STA transitions to the awake state to be able to normally receive the frame.

As such, transmitting of a frame for buffered traffic to an STA operating in the power save mode can be performed based on information capable of identifying the STA. Meanwhile, in a WLAN environment in which the same STA identifying information can be assigned to a plurality of STAs, a method can be required in which communication is performed by assigning new STA identifying information or by re-defining or changing the old STA identifying information according to a specific condition.

SUMMARY OF INVENTION

Technical Problem

The present invention provides a communication method based on a protocol that assigns identifying information to a station (STA) operating in a power save mode in a wireless local area network (WLAN) system, and an apparatus supporting the method.

Technical Solution

In an aspect, a communication method based on identifying information assignment in a wireless local area network (WLAN) system, performed by a station (STA), is provided. The method includes receiving an identifier assignment message from an access point (AP), wherein the identifier assignment message comprises identifying information for the STA, and TIM offset information for a time point at which at least one traffic indication map (TIM) element for the STA starts to be transmitted; receiving a first TIM element from the AP at a time point indicated by the TIM offset information; determining whether the first TIM element comprises the identifying information; and receiving a first data frame from the AP if the first TIM element contains the identifying information.

The identifier assignment message may further include TIM interval information indicating an interval in which the at least one TIM element is transmitted The method may further include receiving a second TIM element at a time point at which the first TIM element is received after the elapse of a time point indicated by the TIM interval information; determining whether the second TIM element comprises the identifying information; and receiving a second data frame from the AP if the second TIM element comprises the identifying information.

The method may further include receiving a new identifier assignment message comprising new identifying information; receiving a third TIM element; determining whether the third TIM element comprises the new identifying information; and receiving a third data frame from the AP if the third TIM element comprises the new identifying information.

The new identifier assignment message may further include new TIM offset information, and the receiving of the third TIM element may be performed at a time point indicated by the new TIM offset information.

The first TIM element may transmitted by being included in a beacon frame which is periodically transmitted, and the TIM offset information may indicate the number of beacon frames transmitted while receiving the first TIM element after the STA receives the identifier assignment message.

The second TIM element may be transmitted by being included in a beacon frame which is transmitted periodically, and the interval in which the TIM element may be transmitted is set to a multiple of an interval of the beacon frame.

The first TIM element may further include traffic class information as information indicating traffic related to the first data frame.

If the first TIM element does not comprises the identifying information, the STA may operate by transitioning to a doze state.

The identifier assignment message may be transmitted by being included in an association response frame transmitted by the AP to the STA in response to an association request frame transmitted to associate the STA with the AP.

The identifying information may be an association ID (AID) assigned when the STA is associated with the AP.

In an another aspect, a wireless apparatus is provided. The apparatus includes a transceiver for transmitting and receiving a radio signal; and a processor operably coupled to the transceiver. The processor is configured for: receiving an identifier assignment message from an access point (AP), wherein the identifier assignment message comprises identifying information for the wireless apparatus, and TIM offset information for a time point at which at least one traffic indication map (TIM) element for the wireless apparatus starts to be transmitted; receiving a first TIM element from the AP at a time point indicated by the TIM offset information; determining whether the first TIM element comprises the identifying information; and receiving a first data frame from the AP if the first TIM element comprises the identifying information.

The processor is further configured for: receiving a new identifier assignment message comprising new identifying information from the AP; receiving a second TIM element from the AP; determining whether the second TIM element comprises the new identifying information; and receiving a second data frame from the AP if the second TIM element comprises the new identifying information.

In still another aspect, a communication method in a wireless local area network (WLAN) system, performed by a STA, is provided. The method includes transmitting a traffic indication request message requesting the AP to indicate whether a buffered traffic for the STA exists, receiving a traffic indication response message from the AP, the traffic indication response message comprising an identifier field including identifier for at least one buffered STA having a buffered traffic, and, a timer field for time synchronization between the STA and the AP, determining a time point at which the STA enters a awake state on a basis of the timer field, entering the awake state at the time point, and, receiving a data frame for the buffered for the STA traffic from the AP.

The timer field may include a timestamp field indicating a time point at which the traffic indication response message is transmitted; a timer accuracy field indicating a margin of error for a timer synchronization function; and, a timer accuracy error limit field a limitation of the margin of error.

Advantageous Effects

Since two or more stations (STAs) to which the same identifying information is assigned can selectively receive a traffic indication map (TIM), it is possible to perform communication based on a TIM protocol in a wireless local area network (WLAN) environment in which the identifying information can be assigned in an overlapping manner. Therefore, an STA having no buffered traffic can be prevented from unnecessary power consumption while maintaining an awake state.

If buffered traffic having a high importance level exists for a specific STA, identifying information for the STA can be modified and a TIM element reception interval can be changed to be short. On the other hand, if there is buffered traffic having a low importance level, the TIM element reception interval can be changed to be long. That is, a power save mode operation can be dynamically performed according to an importance level of traffic.

Unnecessary power consumption of STAs can be avoided by providing a timing synchronization request/response procedure for the power save mode operation.

DESCRIPTION OF DRAWINGS

FIG. 8 shows a format of an AID assignment management frame according to an embodiment of the present invention.

MODE FOR INVENTION

Figure 1:
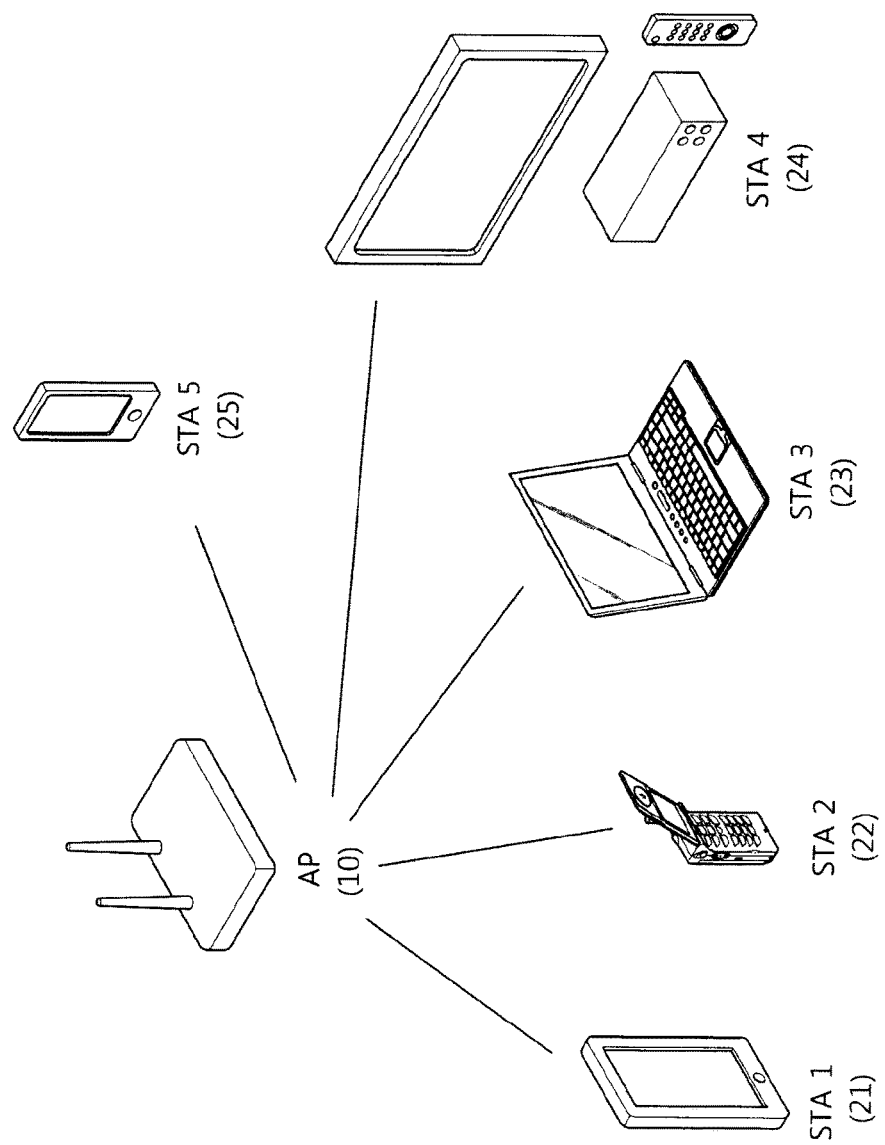
FIG. 1 is a diagram showing the configuration of a WLAN system to which embodiments of the present invention may be applied.

FIG. 1 is a diagram showing the configuration of a WLAN system to which embodiments of the present invention may be applied.

A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In FIG. 1, an association ID (AID) can be assigned to each of STAs 21, 22, 23, 24, and 25 while the STAS are associated with an AP 10. The AID is used uniquely in one BSS. For example, in a current WLAN system, the AID can be given to any one of values 1 to 2007. In this case, for the AID, 14 bits can be assigned to a frame transmitted by the AP and/or the STA, and the AID value can be given to up to 16383. In this case, 2008 to 16383 may be reserved.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem.

For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

Figure 2:
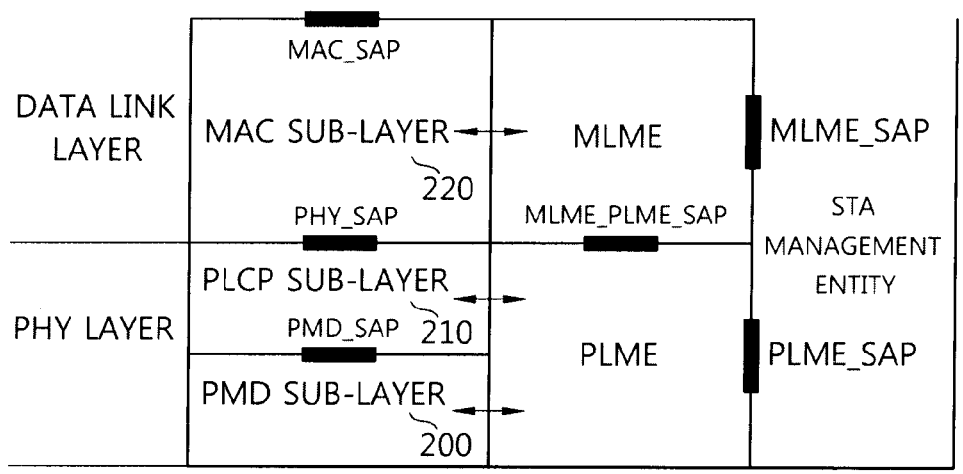
FIG. 2 is a diagram showing the PHY architecture of a WLAN system which is supported by IEEE 802.11.

FIG. 2 is a diagram showing the PHY architecture of a WLAN system which is supported by IEEE 802.11.

The PHY architecture of IEEE 802.11 includes a PHY Layer Management Entity (PLME), a Physical Layer Convergence Procedure (PLCP) sublayer 210, and a Physical Medium Dependent (PMD) sublayer 200. The PLME provides the management function of a physical layer in association with a MAC Layer Management Entity (MLME). The PLCP sublayer 210 transfers a MAC Protocol Data Unit (MPDU), received from a MAC sublayer 220, to the PMD sublayer 200 or transfers a frame, received from the PMD sublayer 200, to the MAC sublayer 220 according to an instruction of a MAC layer between the MAC sublayer 220 and the PMD sublayer 200. The PMD sublayer 200, as a PLCP sublayer, enables the transmission and reception of a physical entity between two STAs through a radio medium. The MPDU transmitted by the MAC sublayer 220 is referred to as a Physical Service Data Unit (PSDU) in the PLCP sublayer 210. The MPDU is similar to the PSDU, but if an Aggregated MPDU (A-MPDU) in which a plurality of MPDUs is aggregated is transferred, each MPDU and each PSDU may be different from each other.

In a process of transferring the PSDU, received from the MAC sublayer 220, to the PMD sublayer 200, the PLCP sublayer 210 adds a supplementary subfield, including information necessary for a physical transceiver, to the PSDU. The field added to the PSDU may include tail bits necessary to restore a PLCP preamble, a PLCP header, and a convolution encoder to a zero state. The PLCP sublayer 210 receives a TXVECTOR parameter, including control information necessary to generate and transmit a Physical Layer Convergence Procedure (PLCP) Protocol Data Unit (PPDU) and control information necessary for a receiving STA to receive and interpret the PPDU, from the MAC sublayer 220. The PLCP sublayer 210 uses the information included in the TXVECTOR parameter in order to generate the PPDU including the PSDU.

The PLCP preamble functions to enable a receiver to be prepared for a synchronization function and an antenna diversity before the PSDU is transmitted. A data field may include padding bits, a service field including a bit sequence for resetting a scrambler, and a coded sequence in which the bit sequence having tail bits added thereto has been encoded in the PSDU. Here, an encoding scheme may be either a Binary Convolutional Coding (BCC) encoding scheme or a Low Density Parity Check (LDPC) encoding scheme according to an encoding scheme supported by an STA that receives a PPDU. The PLCP header includes a field including information about a PLCP Protocol Data Unit (PPDU) to be transmitted. The PLCP header will be described in more detail later with reference to FIG. 3.

The PLCP sublayer 210 generates the PPDU by adding the field to the PSDU and transmits the generated PPDU to a receiving STA via the PMD sublayer 200. The receiving STA receives the PPDU, obtains information necessary to restore data from a PLCP preamble and a PLCP header, and restores the data. The PLCP sublayer of the receiving STA transfers an RXVECTOR parameter, including control information included in a PLCP preamble and a PLCP header, to an MAC sublayer so that the MAC sublayer can interpret the PPDU and obtain data in a reception state.

A WLAN system supports transmit channels of a more contiguous 160 MHz band and a discontiguous 80+80 MHz band in order to support a higher throughput. Furthermore, the WLAN system supports a Multiple User-Multiple Input Multiple Output (MU-MIMO) transmission scheme. In a WLAN system supporting the MU-MIMO transmission scheme, an AP or an STA or both that try to transmit data may transmit data packets to one or more MU-MIMO-paired receiving STAs at the same time.

Referring back to FIG. 1, in a WLAN system, such as that shown in FIG. 1, the AP 10 may transmit data to an STA group including at least one STA, from among the plurality of STAs 21, 22, 23, 24, and 30 associated therewith, at the same time. An example where the AP performs MU-MIMO transmission to the STAs is shown in FIG. 1. In a WLAN system supporting Tunneled Direct Link Setup (TDLS), Direct Link Setup (DLS), or a mesh network, however, an STA trying to send data may send a PPDU to a plurality of STAs by using the MU-MIMO transmission scheme. An example where an AP sends a PPDU to a plurality of STAs according to the MU-MIMO transmission scheme is described below.

The data respectively transmitted to each of the STAs may be transmitted through different spatial streams. The data packet transmitted by the AP 10 may be a PPDU, generated and transmitted by the physical layer of a WLAN system, or a data field included in the PPDU, and the data packet may be referred to as a frame. That is, a data field included in a PPDU for SU-MIMO or MU-MIMO or both may be called an MIMO packet. In an example of the present invention, it is assumed that a target transmission STA group MU-MIMO-paired with the AP 10 includes the STA 1 21, the STA 2 22, the STA 3 23, and the STA 4 24. Here, data may not be transmitted to a specific STA of the target transmission STA group because spatial streams are not allocated to the specific STA. Meanwhile, it is assumed that the STA5 25 is associated with the AP 10, but not included in the target transmission STA group.

In order to support MU-MIMO transmission in a WLAN system, an identifier may be allocated to a target transmission STA group, and the identifier may be called a group ID. An AP transmits a group ID management frame, including group definition information, to STAs supporting MU-MIMO transmission in order to allocate a group ID to the STAs. The group ID is allocated to the STAs based on the group ID management frame prior to PPDU transmission. A plurality of group IDs may be allocated to one STA.

Table 1 below shows information elements included in the group ID management frame.

TABLE 1

| Order | Information |
|-------|-------------|
| 1 | Category |
| 2 | VHT action |
| 3 | Membership status |
| 4 | Spatial stream position |

The frames of the category field and the VHT action field correspond to management frames. The category field and the VHT action field are set to identify that the relevant frames are group ID management frames used in the next-generation WLAN system supporting MU-MIMO.

As in Table 1, group definition information includes the membership status information, indicating whether an STA belongs to a specific group ID, and spatial stream position information indicating that what place is the spatial stream set of a relevant STA located from all the spatial streams according to MU-MIMO transmission if the STA belongs to the relevant group ID.

Since a plurality of group IDs is managed by one AP, membership status information provided to one STA needs to indicate whether the STA belongs to each of the group IDs managed by the AR Accordingly, the membership status information may exist in an array form of subfields, indicating whether the STA belongs to each group ID. The spatial stream position information may exist in an array form of subfields, indicating a position of a spatial stream set occupied by an STA regarding each group ID, because the spatial stream position information indicates a position for each group ID. Furthermore, the membership status information and the spatial stream position information for one group ID may be implemented within one subfield.

If an AP transmits a PPDU to a plurality of STAs according to the MU-MIMO transmission scheme, the AP includes information, indicating a group ID, in the PPDU, and transmits the information as control information. When an STA receives the PPDU, the STA checks whether it is a member STA of a target transmission STA group by checking a group ID field. If the STA is checked to be a member of the target transmission STA group, the STA may check that what place is a spatial stream set, transmitted thereto, placed from all the spatial streams. Since the PPDU includes information about the number of spatial streams allocated to a reception STA, the STA can receive data by searching for spatial streams allocated thereto.

Figure 3:
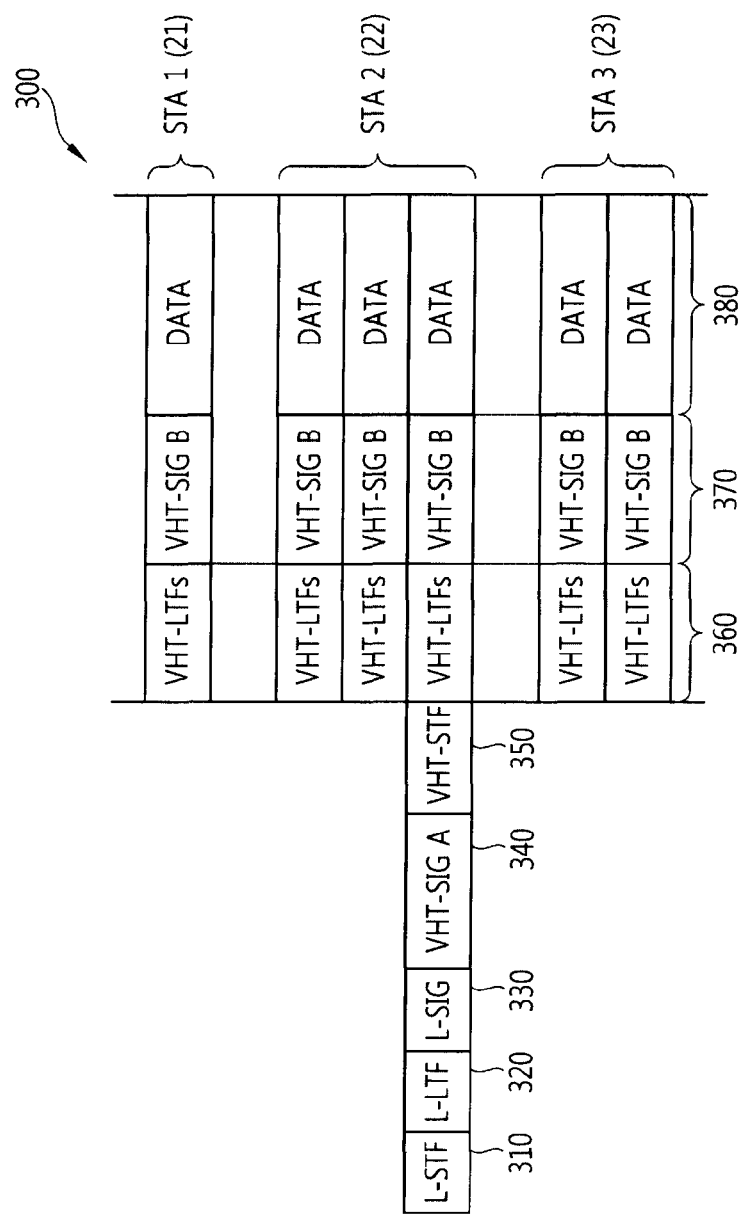
FIG. 3 is a diagram showing an example of a PPDU format used in a WLAN system.

FIG. 3 is a diagram showing an example of a PPDU format used in a WLAN system.

Referring to FIG. 3, a PPDU 300 may include an L-STF 310, an L-LTF 320, an L-SIG field 330, a VHT-SIG A field 340, a VHT-STF 350, a VHT-LTF 360, a VHT-SIG B field 370, and a data field 380.

The PLCP sublayer forming the physical layer converts a PSDU, received from the MAC layer, into the data field 380 by adding necessary information to the PSDU, generates the PPDU 300 by adding fields, such as the L-STF 310, the L-LTF 320, the L-SIG field 330, the VHT-SIG A field 340, the VHT-STF 350, the VHT-LTF 360, and the VHT-SIGB field 370, to the data field 380, and transmits the PPDU 300 to one or more STAs through the PMD sublayer forming the physical layer. Control information necessary for the PLCP sublayer to generate the PPDU and control information, included in the PPDU and transmitted so that a receiving STA can use the control information to interpret the PPDU, are provided from the TXVECTOR parameter received from the MAC layer.

The L-STF 310 is used for frame timing acquisition, Automatic Gain Control (AGC) convergence, coarse frequency acquisition, etc.

The L-LTF 320 is used for channel estimation for demodulating the L-SIG field 330 and the VHT-SIG A field 340.

The L-SIG field 330 is used for an L-STA to receive the PPDU 300 and obtain data by interpreting the PPDU 300. The L-SIG field 330 includes a rate subfield, a length subfield, parity bits, and a tail field. The rate subfield is set to a value indicating a bit rate for data to be transmitted now.

The length subfield is set to a value indicating the octet length of a Physical Service Data Unit (PSDU) that the MAC layer requests a physical layer to send the PSDU. Here, an L_LENGTH parameter related to information about the octet length of the PSDU is determined on the basis of a TXTIME parameter related to transmission time. TXTIME indicates a transmission time determined by the physical layer in order to transmit a PPDU including the PSDU, in response to a transmission time that the MAC layer has requested the physical layer to send the PSDU. Since the L_LENGTH parameter is a parameter related to time, the length subfield included in the L-SIG field 330 includes information related to the transmission time.

A VHT-SIGA field 340 includes control information (or signal information) necessary for interpreting a PPDU 300 by STAs that receive the PPDU. The VHT-SIGA field 340 is transmitted by using two OFDM symbols. Accordingly, the VHT-SIGA field 340 can be divided into a VHT-SIGA1 field and a VHT-SIGA2 field. The VHT-SIGA1 field includes channel bandwidth information used for PPDU transmission, identification information regarding whether space time block coding (STBC) is used, information indicating either SU or MU-MIMO as a PPDU transmission method, information indicating an AP and a transmission target STA group which is a plurality of MU-MIMO paired STAs if the transmission method is MU-MIMO, and information on a spatial stream allocated to each STA included in the transmission target STA group. Table 2 below can be used for reference as a detailed example of the VHT-SIGA1 field.

Information indicating the MIMO transmission method and information indicating the transmission target STA group can be implemented with one piece of MIMO indication information. For example, it can be implemented with a group ID. The group ID can be set to a value having a specific range. A specific value in the range indicates an SU-MIMO transmission method, and values other than the specific value can be used as an identifier for a transmission target STA group when the PPDU 300 is transmitted by using the MU-MIMO transmission method.

Table 2 below can be used for reference as a detailed example of the VHT-SIGA1 field.

[Table 2]

Referring to Table 2 above, in an NSTS part related to information on a spatial stream, a specific bit sequence can be utilized as information indicating a partial AID in case of SU-MIMO transmission. A rule of specifying the partial AID implemented with the specific bit sequence in this case will be described below.

A STA, which transmits a PPDU including MPDUs transmitted in group or a null data packet (NDP) PPDU transmitted subsequently to a null data packet announcement (NDPA) frame transmitted in group, sets a value of an information parameter PARTIAL_AID related to a partial AID of a transmission parameter TXVECTOR to "0".

An AP, which transmits a PPDU to an associated STA or a direct link setup (DLS) or tunneled direct link setup (TDLS) peer STA, sets the value of the information parameter PARTIAL_AID related to the partial AID of the transmission parameter TXVECTOR according to Equation 1 below.

[Math FIG. 1]

Herein, denotes a bitwise exclusive OR operation, and mod X denotes an X-modulo operation. dec(A[b:c]) is the cast to decimal operator where b is scaled by 20 and c by 2c–b. AID[b:c] represents bits b through c inclusive of the AID of the recipient STA with bit 0 being the first transmitted. BSSID[b:c] represents bits b through c inclusive of the BSSID with bit 0 being the Individual/Group bit of a MAC address.

The STA which transmits the PPDU to the DLS or TDLS peer STA can obtain an AID of the peer STA from a DLS setup request frame, a DLS setup response frame, a TDLS setup request frame, or a TDLS setup response frame.

The STA, which transmits the PPDU to the AP or transmits the NDP after transmission of the NDPA frame, sets the PARTIAL_AID information parameter of the transmission parameter TXVECTOR to LSB 9 bits of a BSSID.

An STA which transmits a PPDU to an independent BSS (IBSS) peer STA or an STA which transmits an NDP to the IBSS peer STA after transmission of an NDPA frame sets the PARTIAL_AID information parameter of the transmission parameter TXVECTOR to 0.

An STA which transmits a PPDU including MPDUs transmitted individually to a mesh STA sets the PARTIAL_AID information parameter of a transmission parameter TXVECTOR to LSB 9 bits of a MAC address of a recipient STA.

The AP sets the PARTIAL_AID information parameter to 0 when the partial AID is not allocated to the STA.

If the group ID indicates that the PPDU 300 is transmitted according to the SU-MIMO transmission scheme, the VHT-SIG A2 field includes coding indication information, indicating whether a coding scheme applied to a data field is a Binary Convolution Coding (BCC) scheme or a Low Density Parity Check (LDPC) coding scheme, and Modulation Coding Scheme (MCS) information about a channel between a sender and a recipient. Furthermore, the VHT-SIG A2 field may include the AID of an STA to which the PPDU 300 will be transmitted or a partial AID including some bit sequences of the AID or both.

If the group ID indicates that the PPDU 300 is transmitted according to the MU-MIMO transmission scheme, the VHT-SIG A field 340 includes coding indication information indicating whether a coding scheme applied to a data field to be transmitted to reception STAs that are MU-MIMO-paired is the BCC scheme or the LDPC coding scheme. In this case, Modulation Coding Scheme (MCS) information for each reception STA may be included in the VHT-SIG B field 370.

The VHT-STF 350 is used to improve AGC estimation performance in MIMO transmission.

The VHT-LTF 360 is used for an STA to estimate a MIMO channel. The VHT-LTF 360 may be set to the number corresponding to the number of spatial streams through which the PPDU 300 is transmitted because the next-generation WLAN system supports MU-MIMO. Additionally, full channel sounding is supported. If the full channel sounding is performed, the number of VHT-LTFs may be further increased.

The VHT-SIG B field 370 includes dedicated control information which is necessary for a plurality of MIMO-paired STAs to obtain data by receiving the PPDU 300. Accordingly, only when common control information included in the VHT-SIG B field 370 indicates that the received PPDU 300 has been subjected to MU-MIMO transmission, an STA may be designed to decode the VHT-SIG B field 370. On the other hand, if the common control information indicates that the received PPDU 300 is for a single STA (including SU-MIMO), an STA may be implemented not to decode the VHT-SIG B field 370.

The VHT-SIG B field 370 includes information about an MCS and information about rate matching for each STA. The VHT-SIG B field 370 further includes information indicating the length of a PSDU which is included in a data field for each STA. The information indicating the length of the PSDU is information indicating the length of the bit sequence of the PSDU and may be indicated by an octet unit. The size of the VHT-SIG B field 370 may vary an MIMO transmission type (MU-MIMO or SU-MIMO) and a channel bandwidth used for PPDU transmission.

The data field 380 includes data intended to be transmitted to an STA. The data field 380 includes a service field for resetting a PLCP Service Data Unit (PSDU) to which an MAC Protocol Data Unit (MPDU) in the MAC layer has been transferred and a scrambler, a tail field including a bit sequence necessary to restore a convolution encoder to a zero state, and padding bits for normalizing the length of a data field.

In a WLAN system, such as that shown in FIG. 1, if the AP 10 intends to transmit data to the STA 1 21, the STA 2 22, and the STA 3 23, the AP 10 may transmit the PPDU to an STA group including the STA 1 21, the STA 2 22, the STA 3 23, and the STA 4 24. In this case, the data may be transmitted in such a manner that spatial streams are not allocated to the STA 4 24 and a specific number of spatial streams are allocated to each of the STA 1 21, the STA 2 22, and the STA 3 23, as in FIG. 2. In the example of FIG. 2, it can be seen that one spatial stream has been allocated to the STA 1 21, three spatial streams have been allocated to the STA 2 22, and two spatial streams have been allocated to the STA 3 23.

Meanwhile, if channel sensing is always performed for frame transmission and reception, it causes persistent power consumption of the STA. Since power consumption in a reception state is not much different from power consumption in a transmission state, if the reception state needs to be continuously maintained, relatively great power consumption is generated in an STA that operates by using a battery. Therefore, when the STA senses a channel by persistently maintaining a reception standby state in a WLAN system, ineffective power consumption may be caused without a special synergy effect in terms of a WLAN throughput, and thus it may be inappropriate in terms of power management.

To compensate for the problem above, the WLAN system supports a power management (PM) mode of the STA. A power management (PM) mode of a STA is classified into an active mode and a power save (PS) mode in a WLAN system. Basically, the STA operates in the active mode. When operating in the active mode, the STA can operate in an awake state so that a frame can be received all the time.

When operating in the PS mode, the STA operates by transitioning between a doze state and the awake state. When operating in the doze state, the STA operates with minimum power, and does not receive a radio signal, including a data frame, transmitted from an AP. In addition, the STA operating in the doze state does not perform channel sensing.

The longer the STA operates in a doze state, the less the power consumption is, and thus the longer the STA operates. However, since a frame cannot be transmitted and received in the doze state, the STA cannot operate long unconditionally. If the STA operating in the doze state has a frame to be transmitted to the AP, the STA can transition to an awake state to transmit the frame. However, if the AP has a frame to be transmitted to the STA operating in the doze state, the STA cannot receive the frame and cannot know that there is the frame to be received. Therefore, the STA may need to know whether there is the frame to be transmitted to the STA, and if the frame exists, may require an operation for transitioning to the awake state in accordance with a specific period. According to this operation, the AP can transmit the frame to the STA. This will be described with reference to FIG. 4.

Figure 4:
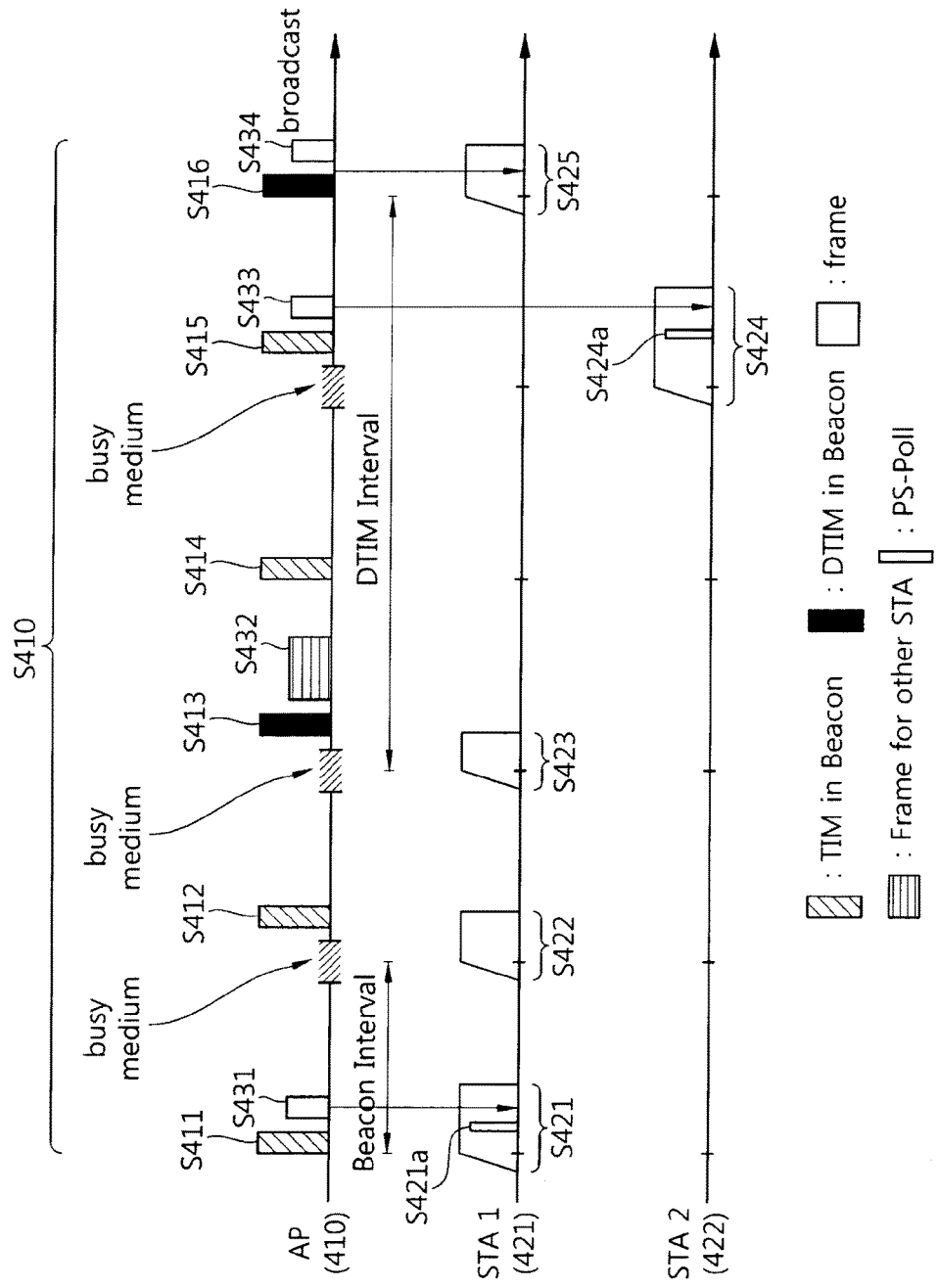
FIG. 4 shows an example of a power management operation.

FIG. 4 shows an example of a power management operation.

Referring to FIG. 4, an AP 410 transmits a beacon frame to STAs in a BSS in accordance with a specific period (step S410). The beacon frame includes a traffic indication map (TIM) information element. The TIM element includes information for reporting that the AP 410 has buffered traffic for which the STAs associated with and a frame will be transmitted. Examples of the TIM element include a TIM used to report a unicast frame and a delivery traffic indication map (DTIM) used to report a multicast or broadcast frame.

The AP 410 transmits the DTIM one time whenever a beacon frame is transmitted three times.

An STA1 421 and an STA2 222 are STAs operating in a PS mode. The STA1 421 and the STA2 422 can be configured such that they can transition from a doze state to an awake state in every wakeup interval of a specific period to receive the TIM element transmitted by the AP 410. A specific wakeup interval can be configured such that the STA1 421 transitions to the awake state in every beacon interval to receive the TIM element. Therefore, the STA1 421 transitions to the awake state (step S421) when the AP 410 transmits a first beacon frame (step S411). The STA1 421 receives the beacon frame and acquires the TIM element. If the acquired TIM element indicates that there is a frame to be transmitted to the STA1 421, then the STA1 221 transmits to the AP 410 a PS poll frame that requests the AP 410 to transmit a frame (step S421a). The AP 410 transmits the frame to the STA1 421 in response to the PS poll frame (step S431). Upon completion of frame reception, the STA1 421 operates by transitioning back to the doze state.

When the AP 410 transmits a second beacon frame, a medium is busy, that is, another device accesses to the medium for example. Thus, the AP 410 may not be able to transmit the beacon frame in accordance with a correct beacon interval but may transmit it at a delayed time point (step S412). In this case, the STA1 421 switches its mode to the wake state in accordance with the beacon interval, but cannot receive the beacon frame transmitted with delay, and thus transitions back to the doze state (step S422).

When the AP 410 transmits a third beacon frame, the beacon frame may include a TIM element which is configured as a DTIM. However, since the medium is busy, the AP 410 transmits the beacon frame with delay (step S413). The STA1 421 operates by transitioning to the awake state in accordance with the beacon interval, and can acquire the DTIM by using the beacon frame transmitted by the AP 410. The DTIM acquired by the STA1 421 indicates that there is no frame to be transmitted to the STA1 421 and there is a frame for another STA. Therefore, the STA1 221 operates by transitioning back to the doze state. After transmitting the beacon frame, the AP 410 transmits the frame to a corresponding STA (step S432).

The AP 410 transmits a fourth beacon frame (step S414). However, since the STA1 421 cannot acquire information indicating that there is buffered traffic for the STA1 421 by receiving the TIM element two times, the STA1 421 may regulate a wakeup interval for receiving the TIM element. Alternatively, if signaling information for regulating a wakeup interval value of the STA1 421 is included in the beacon frame transmitted by the AP 410, the wakeup interval value of the STA1 421 may be regulated. Instead of transitioning an operation state for every beacon interval to receive the TIM element, the STA1 421 can be configured in the present embodiment such that the operation state is transitioned one time for every three beacon intervals. Therefore, the STA1 421 cannot acquire a corresponding TIM element since the AP 410 transmits the fourth beacon frame (step S214), and maintains the doze state when a fifth beacon frame is transmitted (step S415).

When the AP 410 transmits a sixth beacon frame (step S416), the STA1 421 operates by transitioning to the awake state, and acquires the TIM element included in the beacon frame (step S424). The TIM element is a DTIM that indicates existence of a broadcast frame, and thus the STA1 421 receives the broadcast frame transmitted by the AP 410 (step S434) instead of transmitting a PS poll frame to the AP 410.

Meanwhile, the wakeup interval assigned to the STA2 422 may have a longer period than that of the STA1 421. Therefore, the STA2 422 can receive the TIM element by transitioning to the awake state (step S425) when the fifth beacon frame is transmitted (step S415). The STA2 422 knows existence of a frame to be transmitted to the STA2 422 by using the TIM element, and transmits a PS poll frame to the AP 410 to request transmission (step S425a). The AP 210 transmits a frame to the STA2 222 in response to the PS poll frame (step S433).

In order to operate the PS mode of FIG. 4, the TIM element includes a TIM that indicates whether there is a frame to be transmitted to the STA or a DTIM that indicates whether there is a broadcast/multicast frame. The DTIM may be implemented by configuring a field of the TIM element.

A detailed response procedure of the STA that receives the TIM element can be described below with reference to FIG. 5 to FIG. 7.

Figure 5:
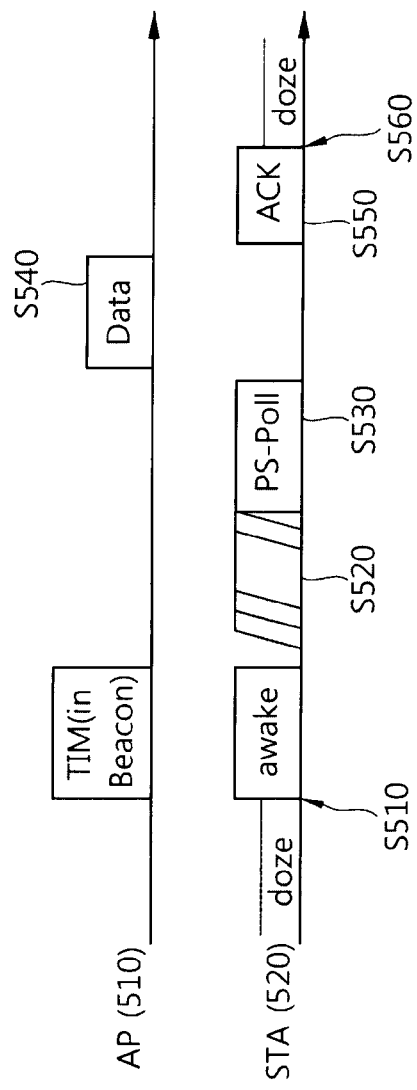
FIG. 5 shows an example of a response procedure of an AP in a TIM protocol.

FIG. 5 shows an example of a response procedure of an AP in a TIM protocol.

Referring to FIG. 5, an STA 520 switches its operation state from a doze state to an awake state to receive a beacon frame including a TIM from an AP 510 (step S510). The STA 520 interprets a received TIM element and thus can know whether there is buffered traffic to be delivered to the STA 520.

The STA 520 contends with other STAs to access to a medium for transmitting a PS poll frame (step S520), and transmits the PS poll frame to request the AP 510 to transmit a data frame (step S530).

Upon receiving the PS poll frame transmitted by the STA 520, the AP 510 transmits a data frame to the STA 520. The STA2 520 receives the data frame, and transmits an acknowledgment (ACK) frame to the AP 510 in response thereto (step S550). Thereafter, the STA2 520 switches its operation mode back to the doze state (step S560).

Instead of immediate response of FIG. 5 in which the data frame is transmitted immediately after receiving the PS poll frame from the STA, the AP may transmit data at a specific time point after receiving the PS poll frame.

Figure 6:
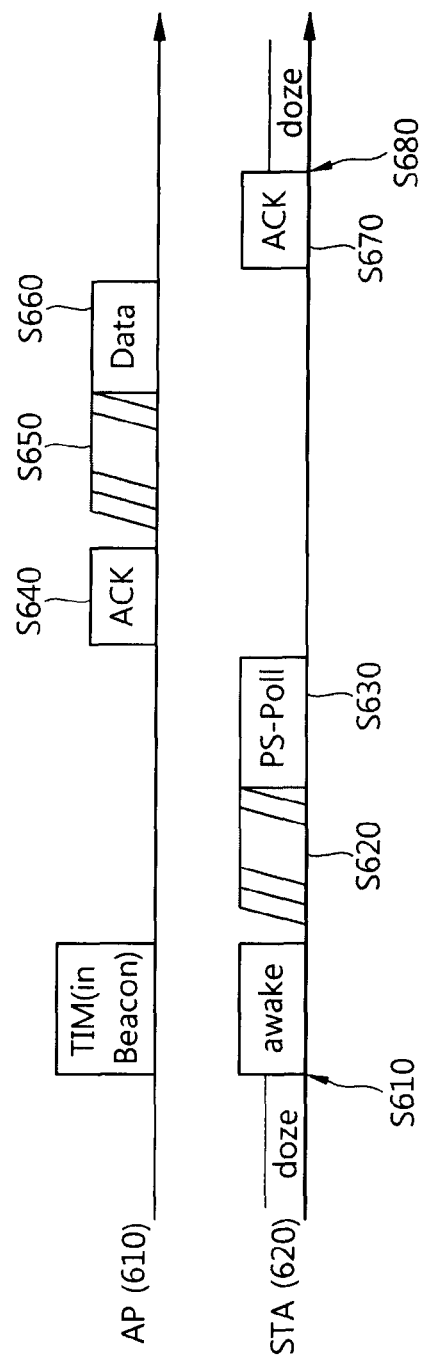
FIG. 6 shows another example of a response procedure of an AP in a TIM protocol.

FIG. 6 shows another example of a response procedure of an AP in a TIM protocol.

Referring to FIG. 6, an STA 620 switches its operation state from a doze state to an awake state to receive a beacon frame including a TIM from an AP 610 (step S610). The STA 620 interprets a received TIM element and thus can know whether there is buffered traffic to be delivered to the STA 620.

The STA 620 contends with other STAs to access to a medium for transmitting a PS poll frame (step S620), and transmits the PS poll frame to request the AP 610 to transmit a data frame (step S630).

If the AP 610 receives the PS poll frame but fails to prepare for a data frame during a specific time interval such as a short inter-frame space (SIFS), instead of directly transmitting the data frame, the AP 610 transmits an ACK frame to the STA 620 (step S640). This is a characteristic of a deferred response which is different from step S540 of FIG. 5 in which the AP 510 directly transmits the data frame to the STA 520 in response to the PS poll frame.

The AP 610 performs contending when the data frame is prepared after transmitting the ACK frame (step S650), and transmits the data frame to the STA 620 (step S660).

The STA 620 transmits an ACK frame to the AP 610 in response to the data frame (step S670), and switches its operation mode to the doze state (step S680).

When the AP transmits a DTIM to the STA, a subsequent procedure of a TIM protocol may differ.

Figure 7:
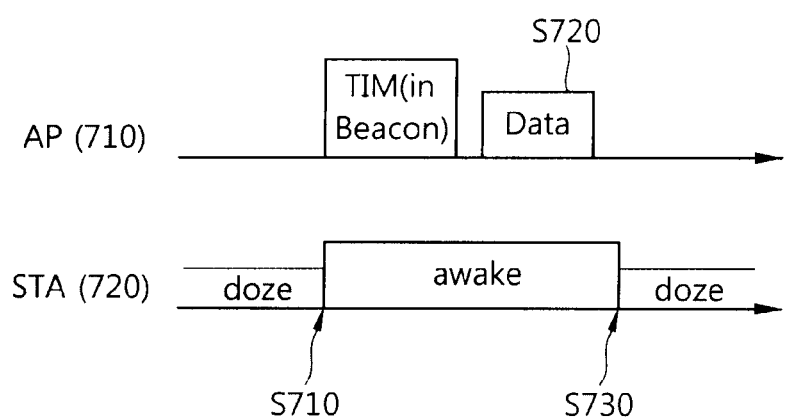
FIG. 7 shows a procedure of a TIM protocol based on a DTIM.

FIG. 7 shows a procedure of a TIM protocol based on a DTIM.

Referring to FIG. 7, an STA 720 switches its operation state from a doze state to an awake state to receive a beacon frame including a TIM from an AP 710 (step S710). The STAs 720 can know that a multicast/broadcast frame will be transmitted by using the received DTIM.

After transmitting a beacon frame including the DTIM, the AP 720 transmits the multicast/broadcast frame (step S720). After receiving the multicast/broadcast frame transmitted by the AP 710, the STAs 720 switch the operation state back to the doze state (step S730).

In the power save mode operation method based on the TIM protocol described with reference to FIG. 4 to FIG. 7, STAs can determine whether there is a data frame to be transmitted for buffered traffic by using STA identifying information included in the TIM element. The STA identifying information may be information related to an association identifier (AID) as an identifier assigned when the STA is associated with an AP. The STA identifying information may be configured to directly indicate AIDs of STAs having buffered traffic or may be configured in a bitmap type in which a bit order corresponding to an AID value is set to a specific value. The STAs can know that there is buffered traffic for them if the STA identifying information indicates their AIDs. The STA identifying information is configured in the bitmap type, and if there is buffered traffic for an STA assigned with a specific AID, a bit value of an order corresponding to the specific AID value can be set to '1'.

One AID is assigned to one STA in one BSS, and the AID may be in the range of 1 to 2007 at present. 14 bits are assigned to indicate the AID, and thus the AID can be assigned with up to 16383. In this case, AID values from 2008 to 16383 are reserved.

Meanwhile, machine to machine (M2M) is drawing attention recently as a next generation communication technique. A standardization work is ongoing to support a WLAN communication protocol supported in such a communication environment. The M2M implies a network for exchanging information by using a machine, not a person, as a communication entity. Examples of constitutional elements of the M2M-based network include a sensor for measuring temperature, humidity, or the like, a camera, a home appliance (e.g., TV, etc.), and a large machine (e.g., a processing machine of a factory, an automobile, etc.). Recently, with the introduction of various communication services (e.g., a smart grid, eHealth, ubiquitous, etc.), the M2M technique is drawing attention to support the communication services. An M2M-based network system has the following characteristics.

1. Great number of STAs: Unlike the conventional network, it is assumed that the M2M requires a great number of STAs. This is because not only a machine owned by a person but also a sensor installed in a house, an office, etc., can be a target to be considered. Therefore, a significantly great number of STAs can be coupled to one AP.

2. Low traffic load per STA: Since an STA constituting an M2M network has a traffic pattern in which information of a surrounding environment is gathered and reported, frequent transmission is not necessary and an amount of the information is relatively small.

3. Uplink-focused: The M2M has a structure in which a command is received in a downlink in general, a specific behavior is performed, and then result data is reported in an uplink. Since important data is transmitted mainly in the uplink in general, the M2M is uplink-focused.

4. Lifespan of STA: An M2M STA operates mainly by using a battery, and it may be difficult for a user to frequently charge the battery. Therefore, whether the STA supports a power save mode may be an important issue.

5. Auto-recovery function: A self-recovery function is necessary in the M2M STA since it is difficult for the user to directly manipulate the STA in a specific situation.

There is an ongoing discussion on a standard for one use case in the M2M communication. A remarkable feature of this standard lies in that a significantly wide coverage (up to 1 km) is provided in an unlicensed band of a sub 1 GHz other than a TV white space in comparison with the conventional indoor-based WLAN. That is, unlike the conventional 2.4 GHz or 5 GHz, when the WLAN is used in the sub 1 GHz band represented by 700 to 900 MHz, the coverage of the AP against the same transmit power is increased by about 2- or 3-fold due to a propagation property at the band. In this case, it is characterized that significantly many STAs can be connected to one AP. The use case considered in the standardization work can be summarized as follows.

Use Case 1: Sensors and Meters
1a: Smart Grid—Meter to Pole
1c: Environmental/Agricultural Monitoring
1d: Industrial process sensors
1e: Healthcare
1f: Healthcare
1g: Home/Building Automation
1h: Home sensors
Use Case 2: Backhaul Sensor and Meter Data
Backhaul aggregation of sensors
Backhaul aggregation of industrial sensors
Use Case 3: Extended Range Wi-Fi
Outdoor extended range hotspot
Outdoor Wi-Fi for cellular traffic offloading The Use Case 1 (sensor and meters) is a use case related to the aforementioned M2M communication. Various types of sensor devices can be connected to an 802.11ah AP to perform M2M communication. Particularly, in case of a smart grid, up to 6,000 sensor devices can be connected to one AP.

The Use Case 2 (backhaul sensor and meter data) is a case where an AP supporting M2M provides a wide coverage and takes a role of a backhaul link of a heterogeneous communication system such as 802.15.4g.

The Use Case 3 is a use case including a case which aims for outdoor extended range hotspot communication such as extended home coverage, campus wide coverage, and shopping malls and a case which aims for distribution of overflowing cellular traffic when the 802.11 ah AP supports traffic offloading of cellular mobile communication. At present, the number of AIDs supported in the WLAN system may be not enough to be used in a WLAN system supporting an M2M application. When the M2M application is applied to this WLAN environment, the number of STAs associated with one AP may be too many. In such an environment, a situation may occur in which one AID is assigned to two or more STAs.

In a WLAN environment in which one AID is assigned to two or more STAs in an overlapping manner, although STAs operating in a power save mode are non-buffered STAs which have no traffic to be actually transmitted to the STAs, a problem may occur in that the STAs are misunderstood as buffered STAs which have buffered traffic and STA identifying information included in the TIM element transmitted by an AP. Therefore, the non-buffered STA persistently maintains an awake state after receiving the TIM element, which results in unnecessary power consumption, thereby decreasing efficiency of the power save mode. In order to solve this problem, a communication method performed by dynamically assigning AIDs to STAs will be described hereinafter.

A method of dynamically assigning the AID allocates and changes an old AID of an STA by an AP while the STA performs communication with the AP such as frame exchange, apart from assigning of the AID to the STA when associating with the AP.

For example, assume that an STA1 and an STA2 are both assigned with an AID of 10, and the two STAs are currently operating in the power save mode. Upon generation of uplink traffic to be transmitted by the STA1 to the AP, the STA1 transitions to the awake mode to report to the AP that there is the uplink traffic. The existence of uplink traffic can be reported by transmitting a service period trigger frame or by transmitting an additionally defined specific frame. The AP receives the frame from the STA1, and then can know that the same AID is assigned to the STA1 and the STA2 in an overlapping manner. Therefore, the AID of the STA1 can be modified such that the AID does not overlap with AIDs assigned to the STA2 and other STAs.

The present invention proposes an AID assignment management frame for AID assignment.

FIG. 8 shows a format of an AID assignment management frame according to an embodiment of the present invention.

Referring to FIG. 8, an AID assignment management frame 800 includes a category field 810, an action field 820, a length field 830, an AID assignment type field 840, and an AID field 850, and may further include a traffic class (TCLAS) field 860.

The category field 810 and the action field 820 are set to a value indicating that a corresponding frame is an AID assignment management frame. The length field 830 indicates a length of the AID assignment management frame 800.

The AID assignment type field 840 indicates a type of the AID assignment management frame 800. The AID assignment management frame 800 can be transmitted to assign an AID to an STA or to release the AID assigned to the STA. In case of assigning the AID, the AID assignment type field 840 can be set to '1'. In case of releasing the AID, the AID assignment type field 840 can be set to '0'. However, the value that is set to the field is for exemplary purposes only, and thus can be implemented in various manners.

The AID field 850 is set to indicate the AID assigned to the STA or the AID released from the STA. When the AID assignment type field 840 indicates AID assignment, the AID indicated by the AID field 850 is assigned to the STA. When the AID assignment type field 840 indicates AID release, the AID indicated by the AID field 850 is released from the STA.

In addition, the AP can assign an AID per traffic. When the AP assigns the AID to a terminal, traffic class (TCLAS) information can be transmitted by being included in the AID assignment management frame 800, and thus it can be signaled that the AID is used only for a frame corresponding to a specific TCLAS. The TCLAS information can be included in the TCLAS field 860. The TCLAS can indicate traffic, and can be configured by combining a source MAC address, a destination MAC address, a source IP address, a destination IP address, etc. When assigning an AID per TCLAS, the STA can selectively receive a frame according to an importance level of traffic. That is, regarding traffic having a high importance level, the AP can be more frequently checked for in order to decrease a delay time. Regarding other traffic, instead of using the delay time, the traffic may be stored in the AP for a longer period of time and then is collectively received in order to increase power saving effect. Accordingly, efficiency of the power save mode can be improved.

When the AP transmits downlink traffic, STAs assigned with the same AID in an overlapping manner transit from a doze state to an awake state until an AID of a transmission target STA with buffered traffic is changed to avoid overlapping assignment. To solve this problem, the present invention proposes a method for assigning an AID to each STA at a different period, according to which an effective TIM including STA identifying information is transmitted, when the AP assigns the AID. Since the TIM element is transmitted by being included in the beacon frame, the changes in the TIM period can be implemented by changing a beacon period.

For example, a WLAN environment in which an AID 10 is assigned to the STA1 and the STA2 in an overlapping manner is assumed. When the AP configures a TIM element indicating buffered traffic to be transmitted to the STA1 and the STA2, the AID 10 is used as STA identifying information in a TIM element of a 1st beacon frame. For example, when there is buffered traffic to be transmitted to the STA1, a value of a 10th order of a bit sequence constituting the STA identifying information having a bitmap type can be set to 1.

Meanwhile, an AID 10 of a TIM element of a 2nd beacon frame is used as STA identifying information for the STA2. That is, if there is buffered traffic to be transmitted to the STA2, a value of a 10th order of a bit sequence constituting the STA identifying information of a bitmap type can be set to 1. Although the STA1 confirms the TIM element of the 1st beacon frame which is an effective beacon frame for the STA1, the STA1 may ignore the TIM element of the 2nd beacon frame which is an ineffective beacon frame.

As such, in order to support the power save mode operation based on the TIM protocol of STAs assigned with the same AID in an overlapping manner, there is a need for a method for providing different TIM periods when assigning the AID, so that a plurality of STAs can receive the TIM element at different time points.

Figure 9:
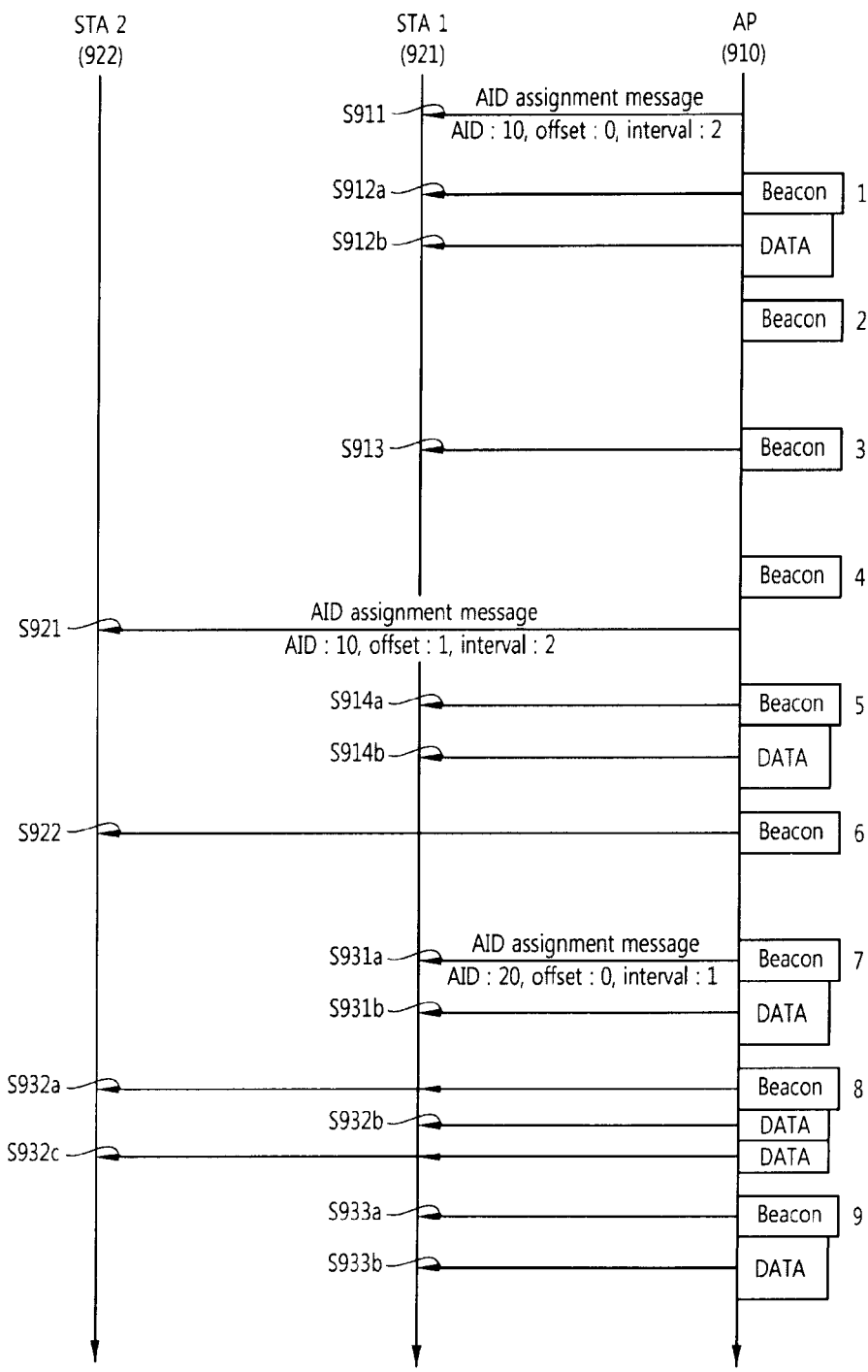
FIG. 9 is a flow diagram showing an example of a communication method of an STA on the basis of an AID assignment method according to an embodiment of the present invention.

FIG. 9 is a flow diagram showing an example of a communication method of an STA on the basis of an AID assignment method according to an embodiment of the present invention.

Referring to FIG. 9, an STA1 921 and an STA2 922 are STAs supporting a power save mode operation. The STA1 921 and the STA2 972 may be in a state in which they are associated with an AP 910 and are assigned with AIDs. The STA1 921 and the STA2 972 can support the power save mode operation on the basis of the TIM protocol described above with reference to FIG. 4 to FIG. 7.

The AP 910 transmits an AID assignment message to the STA1 921 (step S911). Transmitting of the AID assignment message may be equivalent to transmitting of an association response frame which is transmitted by the AP 910 in response to an association request frame transmitted by the STA 921 to request the AP 910 to perform association. The association response message includes an AID assignment information element as the AID assignment message. Alternatively, it may be an AID assignment management frame transmitted by the AP 910 to assign an AID to an STA.

Figure 10:
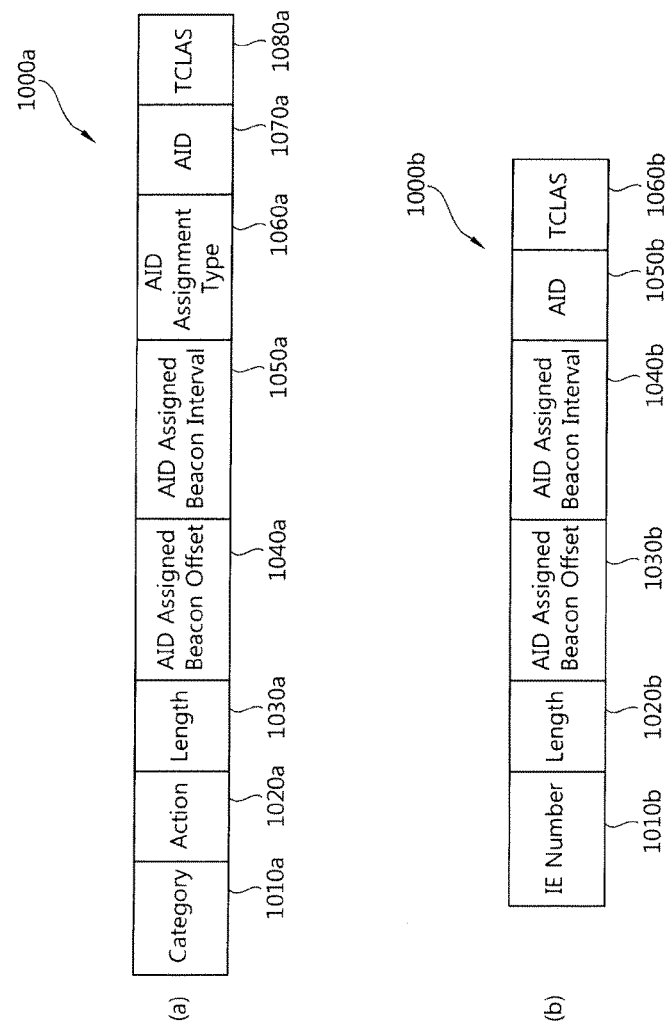
FIG. 10 shows an AID assignment management frame format and an AID assignment information element format according to an embodiment of the present invention.

FIG. 10 shows an AID assignment management frame format and an AID assignment information element format according to an embodiment of the present invention.

FIG. 10(*a*) shows an AID assignment management frame format. An AID assignment management frame 1000*a* includes a category field 1010*a*, an action field 1020*a*, a length field 1030*a*, an AID assigned beacon offset field 1040*a*, an AID assigned beacon interval field 1050*a*, an AID assignment type field 1060*a*, an AID field 1070*a*, and a TCLAS field 1080*a*.

The category field 1010*a* and the action field 1020*a* are set to a value indicating that a transmitted frame is the AID assignment management frame 1000*a*. The length field 1030*a* indicates a length of the transmitted AID assignment management frame 1000*a*.

The AID assignment type field 1060*a* indicates a type of the AID assignment management frame 1000*a*. The AID assignment management frame 1000*a* can be transmitted to assign an AID to an STA or to release the AID assigned to the STA. In case of assigning the AID, the AID assignment type field 1060*a* can be set to '1'. In case of releasing the AID, the AID assignment type field 1060*a* can be set to '0'. However, the value that is set to the field is for exemplary purposes only, and thus can be implemented in various manners.

The AID field 1070*a* indicates an AID to be assigned to or released from a receiving STA. The TCLAS field 1080*a* indicates TCLAS information for the AID. The TCLAS information may refer to the TCLAS field 800 of FIG. 8.

The AID assigned beacon offset field 1040*a* and the AID assigned beacon interval field 1050*a* include offset information and period information to indicate an effective beacon frame including a TIM element for buffered traffic for the receiving STA.

The AID assigned beacon offset field 1040*a* receives several more beacon frames from the currently received AID assignment management frame 1000*a*, and thereafter indicates whether transmission of an effective beacon frame including the TIM element for the STA starts.

The AID assigned beacon interval field 1050*a* indicates the number of beacon frame intervals according to which the effective beacon frame including the TIM element for the STA is transmitted.

FIG. 10B shows an AID assignment information element format. An AID assignment information element can be transmitted by being included in an association response frame, a probe response frame, and/or a beacon frame which are transmitted by an AP.

An AID information element 1000b includes an information element (IE) number field 810b, a length field 1020b, an AID assigned beacon offset field 1030b, an AID assigned beacon interval field 1040b, an AID field 1050b, and a TCLAS field 1060b.

The IE number field 1010b indicates that a corresponding information element included in a frame is the AID information element 1000b. The length field 1020b indicates a length of the AID information element 1000b. The AID field 1050b indicates an AID to be assigned to a receiving STA. The TCLAS field 860b indicates TCLAS information for the AID. The TCLAS information may refer to the TCLAS field 860 of FIG. 8.

The AID assigned beacon offset field 1030b and the AID assigned beacon interval field 1040b are configured in the same manner as those of the AID assigned beacon offset field 1040a and the AID assigned beacon interval field 1050a, and include offset information and period information to indicate an effective beacon frame for the receiving STA.

Referring back to FIG. 9, the STA1 921 receives the AID assignment message (step S911). The STA1 921 is assigned with '10' as an AID by using the AID assignment message. Further, '0' is assigned as an AID assignment beacon offset, and '2' is assigned as an AID assignment beacon interval. Therefore, the STA1 921 performs a power save mode operation at a time of receiving the AID assignment message according to a TIM element of a next transmitted beacon frame.

The STA1 921 receives a first beacon frame (step S912a). Since the first beacon frame is a beacon frame effective for the STA1 921, the STA1 921 determines whether there is buffered traffic for the STA1 921 by using the TIM element included in the beacon frame. If the TIM element includes STA identifying information indicating '10' as an AID of the STA1 921, the STA1 921 receives a data frame for the buffered traffic from the AP 910 (step S912b). Although a second beacon frame is transmitted by the AP 910, since a beacon interval of the STA1 921 is 2, the beacon frame is not an effective beacon frame. Therefore, the STA1 921 does not use the TIM element of the beacon frame.

The STA1 921 receives a third beacon frame (step S913). Although the third beacon frame is an effective beacon frame for the STA1 921, the TIM element may not include STA identifying information indicating '10' as the AID of the STA1 921. In this case, the STA1 921 knows that there is no buffered traffic, and performs the power save mode operation according to the TIM protocol. More specifically, the STA1 921 can operate by transitioning to a doze state until a next beacon frame is transmitted. Since the fourth beacon frame is not an effective beacon frame, the STA1 921 does not use the TIM element of the beacon frame.

The AP 910 transmits an AID assignment message to the STA2 722 (step S921). The STA2 922 is assigned with '10' as an AID by using the AID assignment message. Further, '0' is assigned as an AID assignment beacon offset, and '2' is assigned as an AID assignment beacon interval. Although the AID assigned to the STA2 922 by the AP 910 overlaps with the AID assigned to the STA1 921, an offset and an interval can be used to prevent the STA2 922 from using the same TIM element as that used in the STA1 921.

The STA1 921 receives a fifth beacon frame (step S914a). Since the fifth beacon frame is a beacon frame effective for the STA1 921, the STA1 921 determines whether there is buffered traffic for the STA1 921 by using the TIM element included in the beacon frame. If the TIM element includes STA identifying information indicating '10' as the AID the STA1 921, the STA1 921 receives a data frame for the buffered traffic from the AP 910 (step S914b). On the other hand, since the fifth beacon frame is an ineffective beacon frame for the STA2 922, the STA2 922 does not use the TIM element of the beacon frame.

The STA2 922 receives a sixth beacon frame (step S922). Although the sixth beacon frame is an effective beacon frame for the STA2 922, the TIM element may not include STA identifying information indicating '10' as the AID of the STA2 922. In this case, the STA2 922 knows that there is no buffered traffic, and performs the power save mode operation according to the TIM protocol. On the other hand, since the sixth beacon frame is an ineffective beacon frame for the STA1 921, the STA1 921 does not use the TIM element of the beacon frame.

The STA1 921 receives a seventh beacon frame (step S731a). The beacon frame may be an AID assignment message including an AID assignment information element. In order to transmit a data frame for buffered traffic to the STA1 921 at a higher speed, the AP 910 may assign another AID, which is not assigned in an overlapping manner, to the STA1 921 in replacement of the AID 10 assigned in an overlapping manner. The STA1 721 is assigned with '20' as an AID by using the beacon frame. Further, '0' is assigned as an AID assignment beacon offset, and '1' is assigned as an AID assignment beacon interval. Since the STA1 921 can determine whether there is buffered traffic to be transmitted to the STA1 921 according to a beacon period interval, the buffered traffic can be received at a higher speed.

Since the beacon frame is an effective beacon frame before a new AID is assigned to the STA1 921, the STA1 921 uses a TIM element of the beacon frame. Therefore, if STA identifying information of the TIM element indicates 10 as an AID, the STA1 921 receives a data frame for buffered traffic from the AP 910 (step S931b). On the other hand, since the seventh beacon frame is an ineffective beacon frame for the STA2 922, the STA2 922 does not use a TIM element of the beacon frame.

The STA1 921 and the STA2 922 receive an eighth beacon frame (step S932a). The eighth beacon frame is an effective beacon frame for both of the STA1 921 and the STA2 922. Further, since the AID of the STA1 921 is 20 and the AID of the STA2 922 is 10, a data frame can be transmitted based on a typical TIM protocol. STA identifying information of a TIM element included in the beacon frame can be configured to indicate the AID 10 and the AID 20. In this case, the STA1 921 can receive a data frame from the AP 910 (step S932b), and then the STA2 922 can receive a data frame from the AP 910 (step S932c). The STA1 921 and the STA2 922 can receive the data frame from the AP 910 according to an order which may vary depending on a response of the AP 910 with respect to a poll frame transmitted by the STA.

The STA1 921 receives a ninth beacon frame (step S933a). The ninth beacon frame is an effective beacon frame for the STA1 921, and a TIM element included in the beacon frame indicates that there is buffered traffic for the STA1 921. Thus, the STA1 921 receives a data frame from the AP 910 (step S933b). On the other hand, since the ninth beacon frame is an ineffective beacon frame for the STA2 922, the STA2 922 does not use a TIM element of the beacon frame.

Figure 11:
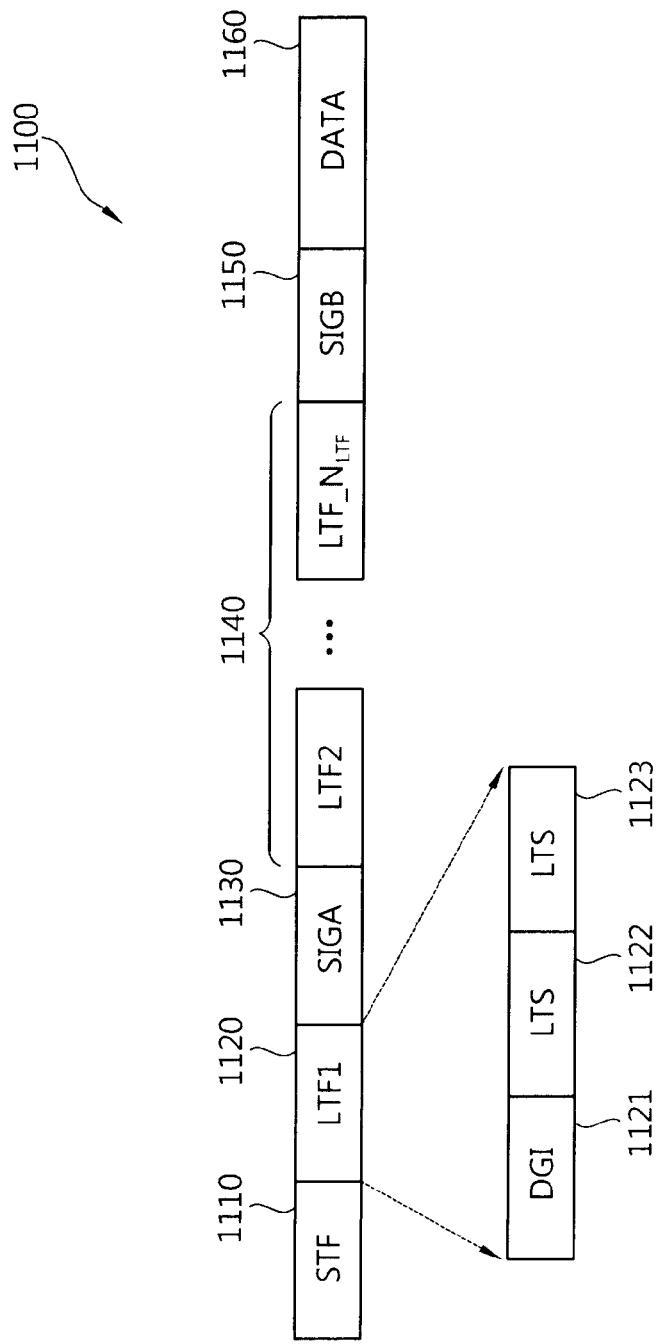
FIG. 11 is a block diagram representing a PPDU format for SU transmission in WLAN system supporting M2M according to an embodiment of the present invention.
Figure 12:
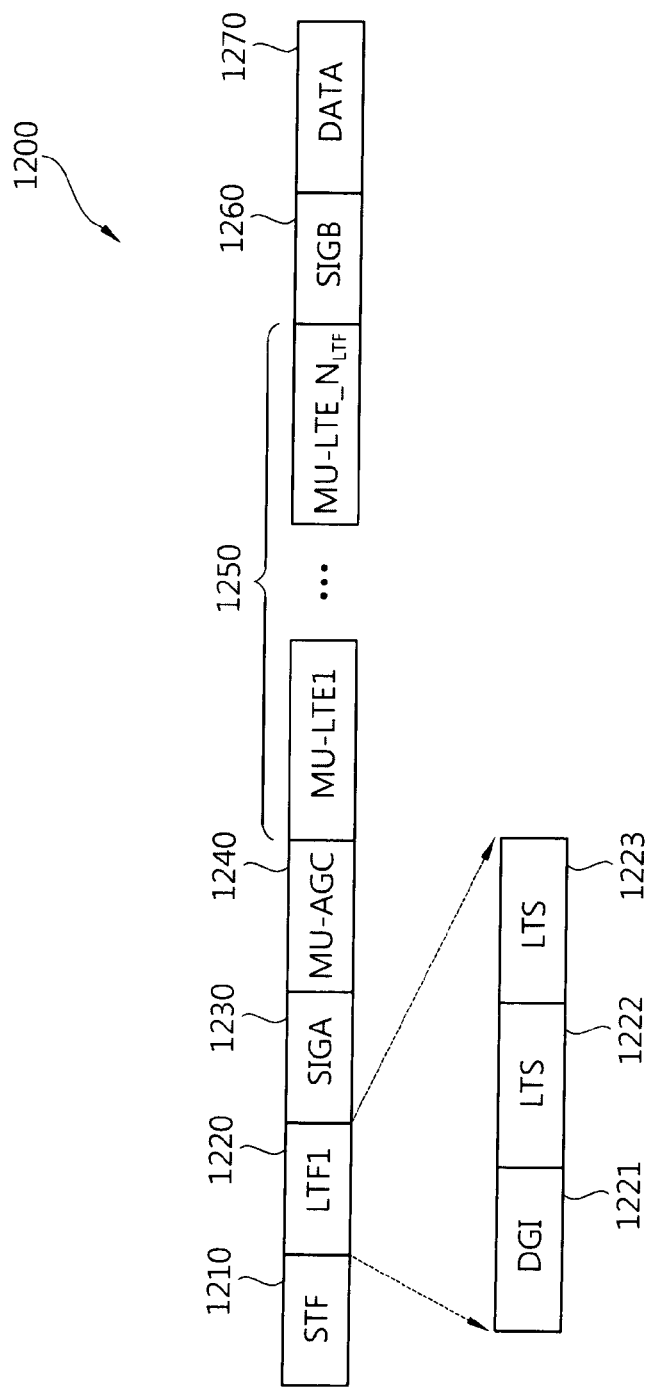
FIG. 12 is a block diagram representing a PPDU format for MU transmission in WLAN system supporting M2M according to an embodiment of the present invention.

Meanwhile, a PPDU format generated in a PLCP sublayer in a WLAN system supporting M2M is provided according to FIGS. 11 and 12.

FIG. 11 is a block diagram representing a PPDU format for SU transmission in WLAN system supporting M2M according to an embodiment of the present invention.

Referring to the FIG. 11, SU-PPDU for SU transmission 1100 includes STF 1110, LTF1 1120, SIG field 1130, a plurality of LTFs 1140 and data field 1150. The STF 1110 is allocated to 2 OFDM symbols. The LTF1 1120 is allocated to 2 OFDM symbols. The SIG field 1130 is allocated to 2 OFDM symbols. Each of the plurality of LTFs 1140 is allocated each OFDM symbol.

Instead of each guard interval (GI) in a each OFDM symbol for LTF, the LTF1 1120 may includes double guard interval (DGI) 1121 and two long training symbols 1122, 1123 in time-domain into which two long training in a frequency-domain is transformed. The DGI is inserted as cyclic prefix (CP), and length of the DGI is two times that of the GI.

FIG. 12 is a block diagram representing a PPDU format for MU transmission in WLAN system supporting M2M according to an embodiment of the present invention.

Referring the FIG. 12, MU-PPDU for MU transmission 1200 includes STF 1210, LTF1 1220 SIGA field 1230, MU-AGC field 1240, a plurality of MU-LTFs 1250, SIGB field 1260 and data field 1270. The STF 1210 is allocated two OFDM symbols. The LTF1 1220 is allocated two OFDM symbols. The SIGA field 1230 is allocated two OFDM symbols. Each of the plurality of MU-LTFs 1250 is allocated to one OFDM symbol. The SIGB field 1260 is allocated one OFDM symbol. The LTF1 1220 may include DIG 1221 and two LTSs 1222, 1223.

The SU-PPDU 1100 in FIG. 11 and the MU-PPDU 1200 in FIG. 12 respectively include STF 1110, 1210 and LTF1 1120, 1220. The corresponding fields implement a function which is similar to that of HT-green field (GF)-STF and HT-LTF1 in HT-GF PPDU, which enable a STA supporting high throughput HT in HT WLAN system to acquire data by receive and demodulate the PPDU. The HT-GF-STF is used for frame timing acquisition and automatic gain control (AGC) by the HT STA. The HT-LTF1 is used for channel estimation for demodulating a SIG field and DATA.

In spite of receiving the HT-GF PPDU, a Legacy STA, unable to support HT, can't demodulate and decode the HT-GF PPDU. As shown in the FIGS. 11 and 12, in sub 1 GHz band, in case of reusing a PPDU format, based on an OFDM defined in a present HT WLAN system standard, by down-clocking, a present OFDM symbol duration is increased by a multiple number for the down-clocking. It occurs that the OFDM symbol duration at time axis is considerably increased. For an example, down-clocking by 1/10 occurs that the OFDM symbol duration is increased by 10 times. If an OFDM symbol duration is 4 μs in a present WLAN system, the OFDM symbol duration is increased to 40 μs in a sub 1 GHz band. If clock speed is decreased by the down-clocking, an inaccuracy of Time Synchronization Function TSF timer is increased. Furthermore, it is more difficult for a STA, entering an awake state after operating in a doze state for a long time, to maintain timing synchronization with an AP.

Meanwhile, if a doze period of the STA increases, a problem may arise in that timing synchronization does not match between the AP and the STA. Especially, in an embodiment in which a period of a beacon frame that uses a specific AID for each STA is assigned differently for each terminal when the AP assigns the AID, it is assumed that correct timing synchronization is maintained between the AP and the STA. Therefore, a general procedure for highly accurate timing synchronization between the AP and the STA is required.

In a case where a time-synchronization function (TSF) timer of the STA has an accuracy of +/−0.01%, if the STA has a doze period of 1000 s, then a TSF timer error of the STA becomes +/−100 ms. If a beacon interval of the AP is 100 ms, there is a case where the TSF timer error of the STA is greater than a beacon interval. In such an environment, it may be difficult to normally perform a power save mode operation method in which a period of using the beacon frame is applied differently for each terminal.

In low cost devices such as a sensor node, an accuracy of the TSF timer is low, and also battery capacity is also low. By considering the low cost devices, a method for acquiring information capable of determining a next operation state by using a request/response frame such as polling is proposed, instead of determining by the STA an operation state by using the TIM element of the beacon frame.

In order to know whether there is buffered traffic for the STA, the STA in the doze state transitions to an awake state at any time and transmits a traffic indication request frame to the AP. The traffic indication request frame is transmitted irrespective of a beacon interval of the AP, and can be transmitted after acquiring a channel access right on the basis of a CSMA/CA mechanism by a transmitter.

Figure 13:
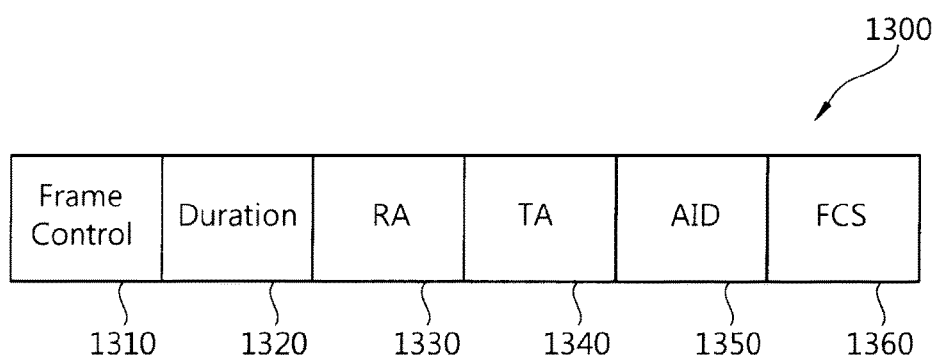
FIG. 13 shows a traffic indication request frame according to an embodiment of the present invention.

FIG. 13 shows a traffic indication request frame according to an embodiment of the present invention.

Referring to FIG. 13, a traffic indication request frame 1300 includes a frame control field 1310, a duration field 1320, a receiver address (RA) field 1330, a transmitter address (TA) field 1340, an AID field 1350, and a frame check sequence (FCS) field 1360.

The frame control field 1310 includes information for interpreting the traffic indication request frame 1300. The duration field 1320 includes information indicating a length of the traffic indication request frame 1300 and information indicating a time for exchanging a request/response frame. The RA field 1330 includes MAC address information of an AP that receives the traffic indication request frame 1300. The TA field 1340 includes MAC address information of an STA that transmits the traffic indication request frame 1300. When an effective AID is assigned by the AP to the STA that transmits the traffic indication request frame 1300, the AID field 1350 is configured to indicate the AID. The FCS field 1360 includes information used to determine whether the traffic indication request frame 1300 is a normal frame.

Figure 14:
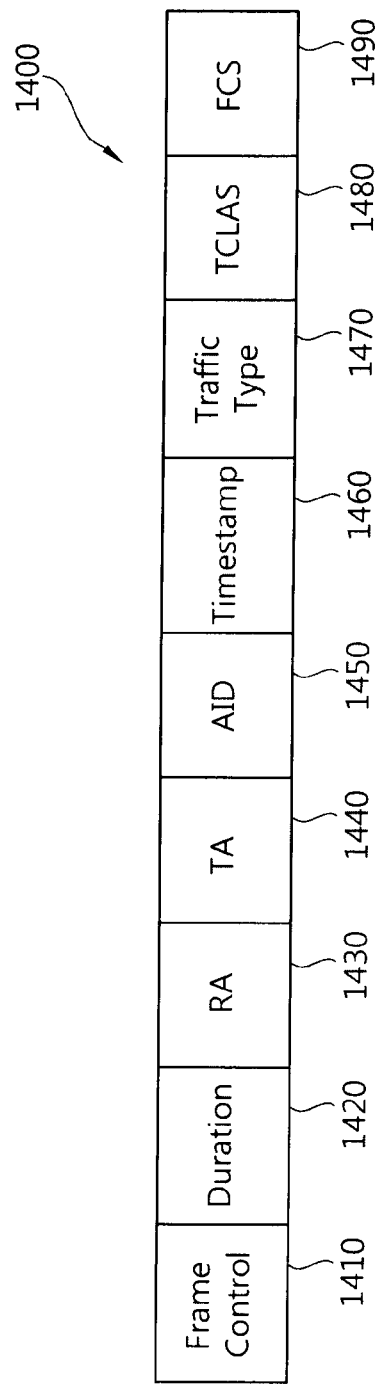
FIG. 14 shows a traffic indication response frame according to an embodiment of the present invention.

Upon receiving the traffic indication request frame, the AP reports whether there is buffered traffic for the STA. For this, the traffic indication response frame is transmitted to the STA. FIG. 14 shows a traffic indication response frame according to an embodiment of the present invention.

Referring to FIG. 14, a traffic indication response frame 1400 includes a frame control field 1410, a duration field 1420, an RA field 1430, a TA field 1440, an AID field 1450, a timestamp field 1460, a traffic type field 1470, a TCLAS field 1480, and an FCS field 1490.

The frame control field 1410 includes information for interpreting the traffic indication response frame 1400. The duration field 1420 includes information indicating a length of the traffic indication response frame 1400 or information indicating a time for exchanging a request/response frame. The RA field 1430 includes MAC address information of an STA that receives the traffic indication response frame 1400, and this may be a MAC address of an STA that transmits the traffic indication request frame 1300. The TA field 1440 includes MAC address information of an AP that transmits the traffic indication response frame 1400.

If there is no buffered traffic for the STA that transmits the traffic indication request frame 1300, the AID field 1450 can be set to a specific value (e.g., 0 or 65535) other than an AID of the STA. If there is buffered traffic for the STA, the AID field 1450 includes information indicating an AID already assigned to a corresponding terminal. In a case where the AID is dynamically assigned as described in the previous embodiment of the present invention, if the STA has no effective AID used to receive a data frame for the buffered traffic from the AP, a new AID is assigned to the STA, and the AID field 1450 may include information indicating the AID.

The timestamp field 1460 includes information for timing synchronization between the AP and the STA.

The traffic type field 1470 includes information for reporting a type of buffered traffic. Examples of the traffic type may include emergency, real-time, best-effort, background, etc.

The TCLAS field 1480 includes information for providing more detailed traffic information.

As such, the request frame/response frame may be a control frame or a management frame. When it is transmitted in a control frame format, the response frame can be transmitted at the elapse of interframe space (SIFS) without contention after transmitting the request frame.

The aforementioned embodiment of the present invention corresponds to a method for decreasing power consumption of an STA in an IEEE 802.11-based WLAN system that uses a frequency band of 1 GHz or lower. In this case, if an interval in which the STA transitions from the doze state to the awake state increases, a problem occurs in that an error of a TSF timer increases.

In a case where an accuracy of the TSF timer of the AP is +/−0.01%, if the STA has a doze period of 1000 s, an error of the TSF timer of the AP becomes +/−100 ms. This value is determined without considering a TSZF timer error of the STA.

In a case where the TSF timer error of the AP is +/−0.001%, if the STA has a doze period of 1000 s, then the TSF timer error of the AP becomes +/−10 ms.

In order for the STA to receive a beacon frame transmitted by the AP, the STA has to transition to the awake state prior to a target beacon transmission time (TBTT) by 100 ms or 10 ms.

If the STA knows TSF timer accuracy information of the AP, the AP's TSF timer error generated during a doze period can be calculated, and unnecessary power consumption can be decreased by transitioning to the awake state at a more correct time. On the other hand, if there is no information on TSF timer accuracy, the STA needs to determine a time of transitioning to the awake state by considering a minimum requirement for the TSF timer accuracy.

In order for an AP to report information on accuracy of a TSF timer of the AP itself to STAs, it is proposed a method of transmitting a frame including a TSF timer information element described below.

Figure 15:
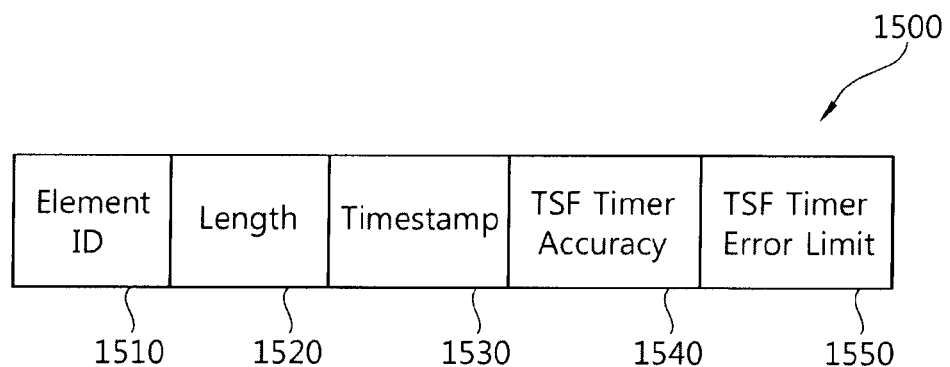
FIG. 15 shows a TSF timer accuracy information element.

FIG. 15 shows a TSF timer accuracy information element. The TSF timer information element can be included in a beacon frame, a probe response frame, an association request frame, an association response frame, a re-association request frame, a re-association response frame, and/or a traffic indication response frame.

Referring to FIG. 15, a TSF timer information element 1500 includes an element ID field 1510, a length field 1520, a timestamp field 1530, a TSF timer accuracy field 1540, and a TSF timer error limit field 1550. The element ID field 1510 indicates that an information element included therein is the TSF timer information element 1500. The length field 1520 indicates a length of the TSF timer information element 1500.

The timestamp field 1530 indicates a current timestamp value of a TSF timer.

The TSF timer accuracy field 1540 indicates a margin of error for the TSF timer in a unit of parts per million (PPM). For example, if an accuracy of the TSF timer is 100 PPM, it indicates an error of +/−0.01%, and a TSF timer value after 1000 s may have an error of +/−100 ms. If an AP corrects the TSF timer error after a specific time elapses, a margin of the TSF timer error does not exceed a specific value. For example, the AP can correct the TSF timer by using an external time source. Examples of the external time source may include a network time protocol (NTP), a global positioning system (GPS), etc.

A TSF timer error limit field 1550 indicates a threshold for a TSF timer error range. When the field is set to 10 ms, the TSF timer error of the AP cannot exceed +/−10 ms. If the TSF timer error of the AP exceeds the range of +/−10 ms, the AP can correct the error at a specific time point from an external source. That is, since the STA can know a threshold of a maximum TSF timer error range of the AP by using the TSF timer error limit field 1550, an early wakeup time can be calculated by using the threshold in order not to lose a frame such as a beacon frame.

Meanwhile, in order for the AP to report TSF timer accuracy information of the AP itself to the STAs, it is proposed a method of transmitting a revised timestamp field by inserting it into a beacon frame, a probe response frame, an association response frame, a re-association response frame, etc.

Since the time stamp field is a field other than an information element, the field itself is transmitted by being included in the beacon frame or the like in general. In a current WLAN system, 8 octets are assigned to the time stamp field, thereby being able to express 264 states in total. In addition, each state is used in such a manner that the state is incremented by one for every 1 micro second (us). It can be indicated by generating a time stamp value during 264 us:=18 trillion sec:=584,942 years. That is, by considering a fact that bits allocated to the time stamps do not have to be excessively long as descried above, the present invention proposes a method of utilizing some MSB or LSB bits of the time stamp field having a size of 8 octets as a part including the TSF timer accuracy information.

Figure 16:
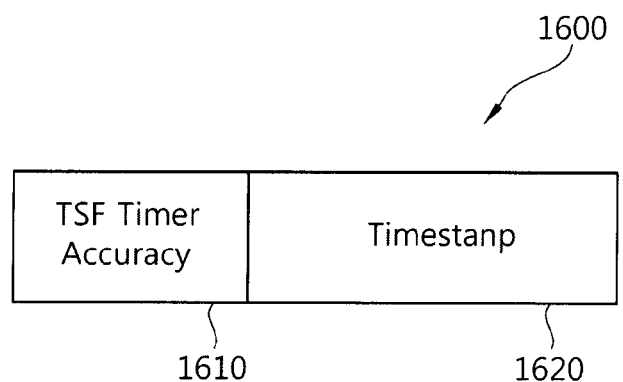
FIG. 16 shows a revised time stamp field format according to an embodiment of the present invention.

FIG. 16 shows a revised time stamp field format according to an embodiment of the present invention.

Referring to FIG. 16, a revised time stamp field 1600 includes a TSF timer accuracy sub-field 1610 and a time stamp sub-field 1620. In the bit sequence allocated to the conventional time stamp field having a size of 8 octets, MSB 3 bits are configured as the TSF timer accuracy sub-field. The revised time stamp field 1600 may have a size of 8 octets in total. The TSF timer accuracy sub-field 1610 may have a size of 3 bits. The time stamp sub-field 1620 may have a size of 61 bits.

Table 3 below can be used for reference as an example of encoding of the TSF timer accuracy sub-field 1610.

TABLE 3

| Value | Description |
|---|---|
| 0 | TSF Timer Accuracy is not worse than +/−3 ppm |
| 1 | TSF Timer Accuracy is not worse than +/−6 ppm |
| 2 | TSF Timer Accuracy is not worse than +/−9 ppm |
| 3 | TSF Timer Accuracy is not worse than +/−12 ppm |
| 4 | TSF Timer Accuracy is not worse than +/−15 ppm |
| 5 | TSF Timer Accuracy is not worse than +/−18 ppm |
| 6 | TSF Timer Accuracy is not worse than +/−21 ppm |
| 7 | TSF Timer Accuracy is worse than +/−21 ppm |

A bit sequence having a size of remaining 61 bits is used as the time stamp sub-field 1620. A time period that can be expressed by a sub-field having a size of 61 bits can be indicated by generating a unique time stamp value during a time period of $2^{61}$ μs:=2 trillion sec:=73,117 years, thereby being able to perform a proper time stamp function. According to the aforementioned format, there is an advantage in that TSF timer accuracy information can be delivered without an additional overhead in the conventional WLAN system operation.

Meanwhile, the TSF timer accuracy sub-field 1610 can be configured with MSB 2 bits of a bit sequence constituting a time stamp field having the conventional size of 61 octets. In this case, Table 4 below can be used for reference as an example of encoding the TSF timer accuracy sub-field 1410.

TABLE 4

| Value | Description |
|---|---|
| 0 | TSF Timer Accuracy is not worse than +/−5 ppm |
| 1 | TSF Timer Accuracy is not worse than +/−10 ppm |
| 2 | TSF Timer Accuracy is not worse than +/−15 ppm |
| 3 | TSF Timer Accuracy is worse than +/−20 ppm |

In addition, in an environment where an OFDM symbol duration becomes significantly long such as a WLAN system supporting M2M, a beacon frame is occupied by a wireless medium for a long time period to perform transmission. It is proposed to simplify the beacon frame to a great extent so that the simplified beacon frame is used to increase efficiency of the wireless medium.

Figure 17:
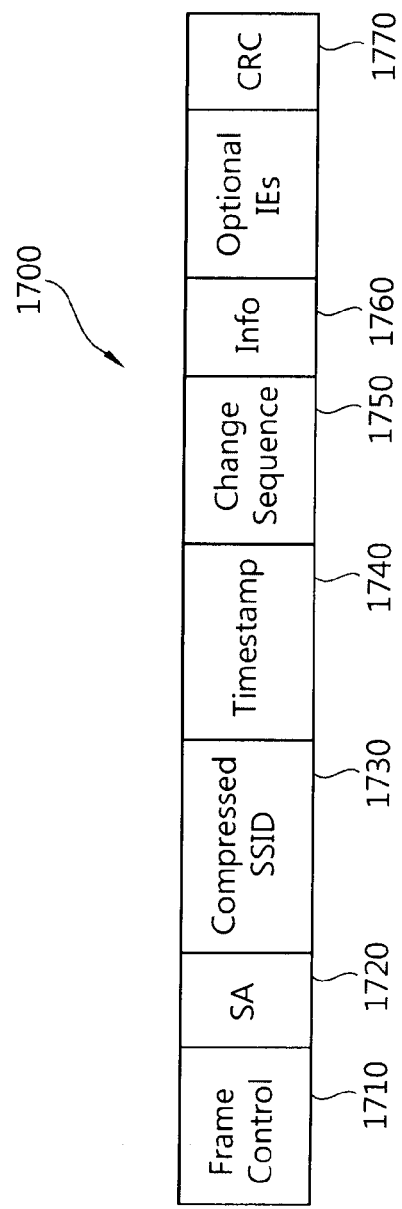
FIG. 17 is a block diagram showing a format of a short beacon frame according to an embodiment of the present invention.

FIG. 17 is a block diagram showing a format of a short beacon frame according to an embodiment of the present invention.

Referring to FIG. 17, a short beacon frame 1700 includes a frame control field 1710, an SA field 1720, a compressed SSID field 1730, a time stamp field 1740, a change sequence field 1750, an Info field 1760, and a CRC field 1770. If there is a need to transmit additional information elements, the information elements can be additionally included. This format corresponds to a format in which fields for the respective information elements included in the existing beacon frame are compressed.

The time stamp field 1740 included in the short beacon frame 1700 can be configured by decreasing its size to 4 octets instead of the conventional size of 8 octets. If the time stamp field 1740 has a size of 4 octets, a time duration that can be expressed by a time stamp consisting of 32 bits in total can be indicated by generating a unique time stamp value during a time of $2^{32}$ us:=4,295 sec:=72 min.

Instead of a unit of us, if a higher time unit is used as a time period expressed by one state of the time stamp, an absolute time consumed for one time stamp circulation can be further increased. The TSF timer accuracy sub-field can be implemented as shown in the example of FIG. 16 with respect to the time stamp field of the short beacon frame 1700. That is, in the time stamp field 1740 having a size of 4 octets, 3 bits or 2 bits can be assigned as the TSF timer accuracy sub-field, and a sequence of the remaining bits can be assigned to indicate a time stamp value. In this case, a bit sequence length for the time stamp itself is decreased to 4 octets, and thus the number of expressible states is significantly decreased. Therefore, it may be preferable to allocate MSB 2 bits to the TSF timer accuracy sub-field.

Figure 18:
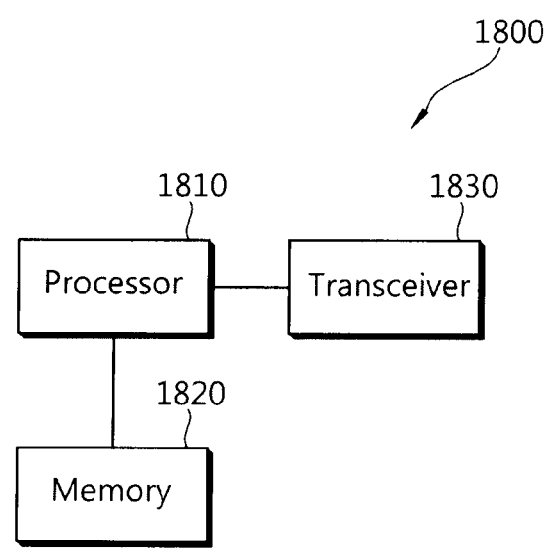
FIG. 18 is a block diagram of a wireless apparatus according to an embodiment of the present invention.

FIG. 18 is a block diagram of a wireless apparatus according to an embodiment of the present invention.

Referring to FIG. 18, a wireless apparatus 1800 includes a processor 1810, a memory 1820, and a transceiver 1830. The transceiver 1830 transmits and/or receives a radio signal, and implements an IEEE 802.11 physical (PHY) layer. The processor 1810 functionally coupled to the transceiver 1830 is configured to transmit and receive an AID assignment message and a TIM element and to implement a MAC layer and/or a PHY layer for implementing the embodiment of the present invention shown in FIG. 2 to FIG. 17 in which a data frame is transmitted and received based on information included in the TIM element. The processor 1810 can be configured to interpret the AID assignment message to confirm an AID assigned to the apparatus, and to acquire TCLAS information for the AID. Further, the processor 1810 can be configured to receive information for timing synchronization, to calculate timing of transitioning to an awake state on the basis of the information, and to operate according to the timing.

The processor 1810 and/or the transceiver 1830 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1820 and may be performed by the processor 1810. The memory 1820 may be located inside or outside the processor 1810, and may be coupled to the processor 1810 by using various well-known means.

The invention claimed is:

1. A method for performing an association with an access point (AP) in a wireless local area network, the method comprising:

transmitting, by a station to the AP, an association request frame requesting allocation of an association identifier (AID) of the station; and receiving, by the station, an association response frame from the AP in response to the association request frame, the association response frame including an AID information element comprising an AID field, an AID switch count field, and an AID interval field, the AID field indicating a new AID when the AP changes an AID of the station, the AID switch count field indicating a count value, in units of beacon intervals, that the AP sets for the station to switch to the new AID, and the AID interval field indicating an interval, in units of beacon intervals, during which the station wakes to receive a beacon frame from the AP.

2. The method of claim 1, wherein the beacon frame includes a traffic indication map (TIM) element including the new AID.

3. The method of claim 2, wherein the TIM element indicates whether there is buffered traffic for the station identified by the new AID.

4. The method of claim 1, wherein the AID information element further comprises a length field indicating the length of the AID information element.

5. The method of claim 1, wherein the AID field has a length of two octets.

6. A wireless station performing an association with an access point (AP) in a wireless local area network, the wireless station comprising:
    a transceiver that transmits and receives signals; and
    a processor, coupled to the transceiver, that:
        instructs the transceiver to transmit to the AP an association request frame requesting allocation of an association identifier (AID) of the station; and
        instructs the transceiver to receive an association response frame from the AP in response to the association request frame, the association response frame including an AID information element comprising an AID field, an AID switch count field, and an AID interval field,
    the AID field indicating a new AID when the AP changes an AID of the station,
    the AID switch count field indicating a count value, in units of beacon intervals, that the AP sets for the station to switch to the new AID, and
    the AID interval field indicating an interval, in units of beacon intervals, during which the station wakes to receive a beacon frame from the AP.

7. The wireless station of claim 6, wherein the beacon frame includes a traffic indication map (TIM) element including the new AID.

8. The wireless station of claim 7, wherein the TIM element indicates whether there is buffered traffic for the station identified by the new AID.

9. The wireless station of claim 6, wherein the AID information element further comprises a length field indicating the length of the AID information element.

10. The wireless station of claim 6, wherein the AID field has a length of two octets.

11. A method for performing an association with a station in a wireless local area network, the method comprising:
    receiving, by an access point (AP), an association request frame from the station requesting allocation of an association identifier (AID) of the station; and
    transmitting, by the AP, an association response frame in response to the association request frame to the station, the association response frame including an association identifier (AID) information element comprising an AID field, an AID switch count field, and an AID interval field,
    the AID field indicating a new AID when the AP changes an AID of the station,
    the AID switch count field indicating a count value, in units of beacon intervals, that the AP sets for the station to switch to the new AID, and
    the AID interval field indicating an interval, in units of beacon intervals, during which the station wakes to receive a beacon frame from the AP.

12. The method of claim 11, wherein the beacon frame includes a traffic indication map (TIM) element including the new AID.

13. The method of claim 12, wherein the TIM element indicates whether there is buffered traffic for the station identified by the new AID.

14. The method of claim 11, wherein the AID information element further comprises a length field indicating the length of the AID information element.

15. The method of claim 11, wherein the AID field has a length of two octets.

* * * * *